United States Patent [19]
Lohstroh et al.

[11] Patent Number: 5,953,419
[45] Date of Patent: Sep. 14, 1999

[54] CRYPTOGRAPHIC FILE LABELING SYSTEM FOR SUPPORTING SECURED ACCESS BY MULTIPLE USERS

[75] Inventors: Shawn R. Lohstroh, Princeton, N.J.; William D. McDonnal, Tigard; David Grawrock, Aloha, both of Oreg.

[73] Assignee: Symantec Corporation, Cupertino, Calif.

[21] Appl. No.: 08/642,217

[22] Filed: May 6, 1996

[51] Int. Cl.⁶ .................................................. H04L 9/02
[52] U.S. Cl. ........................................................ 380/21
[58] Field of Search ....................................... 380/21, 49

[56] References Cited

U.S. PATENT DOCUMENTS

| | | | |
|---|---|---|---|
| 4,854,616 | 8/1989 | Pond et al. | 380/25 |
| 4,881,263 | 11/1989 | Herbison et al. | 380/21 |
| 5,029,207 | 7/1991 | Gammie | 380/10 |
| 5,052,040 | 9/1991 | Preston et al. | 380/4 |
| 5,151,938 | 9/1992 | Griffin, III et al. | 380/43 |
| 5,465,299 | 11/1995 | Matsumoto et al. | 380/23 |
| 5,495,533 | 2/1996 | Linehan et al. | 380/21 |
| 5,563,946 | 10/1996 | Cooper et al. | 380/4 |
| 5,604,803 | 2/1997 | Aziz | 380/25 |
| 5,615,264 | 3/1997 | Kazmierczak | 380/4 |

*Primary Examiner*—Gail O. Hayes
*Assistant Examiner*—Carmen White
*Attorney, Agent, or Firm*—Fliesler, Dubb, Meyer & Lovejoy

[57] ABSTRACT

A system is disclosed for automatically distributing secured versions (*Sys_D_key*) of a file decryption key (Sys_D_key) to a plurality of file users by way of the file's security label. The label is defined to contain a plurality of Access-Control-Entries Records (ACER's) where each ACER includes a respective secured version (*Sys_D_key*) of the file decryption key. Each such secured version (*Sys_D_key*) is decipherable by a respective ACER private key. Each ACER may include respective other data such as:

(a) ACER-unique identifying data for uniquely identifying the ACER or an associated user;

(b) decryption algorithm identifying data for identifying the decryption process to be used to decrypt the encrypted *DATA* portion of the file; and (c) special handling code for specifying special handling for the code-containing ACER. The label is preferably covered by a digital signature but includes an extension buffer that is not covered by the digital signature. Users who wish to have an ACER of their own added to the label may submit add-on requests by writing to the extension buffer.

53 Claims, 9 Drawing Sheets

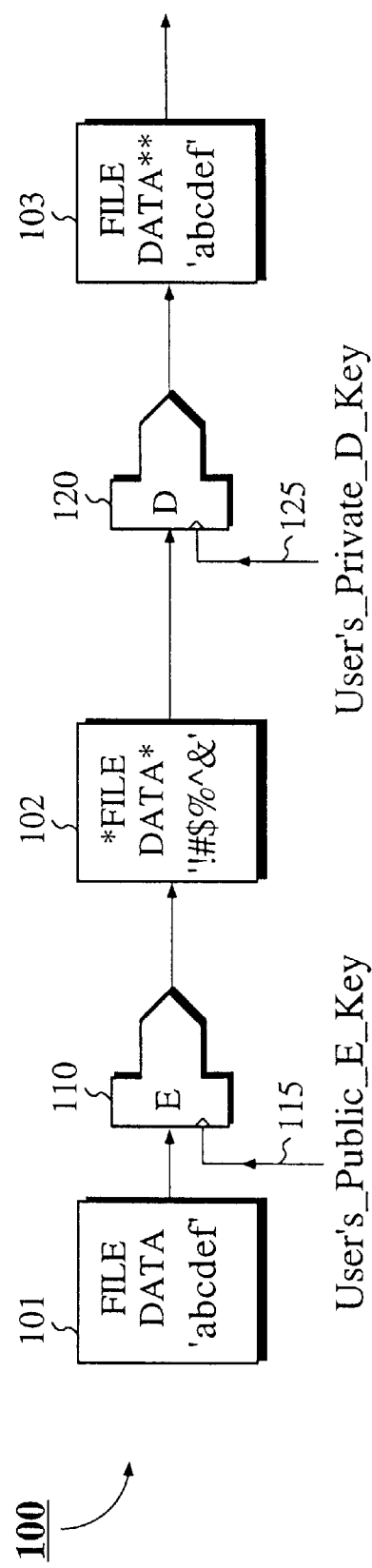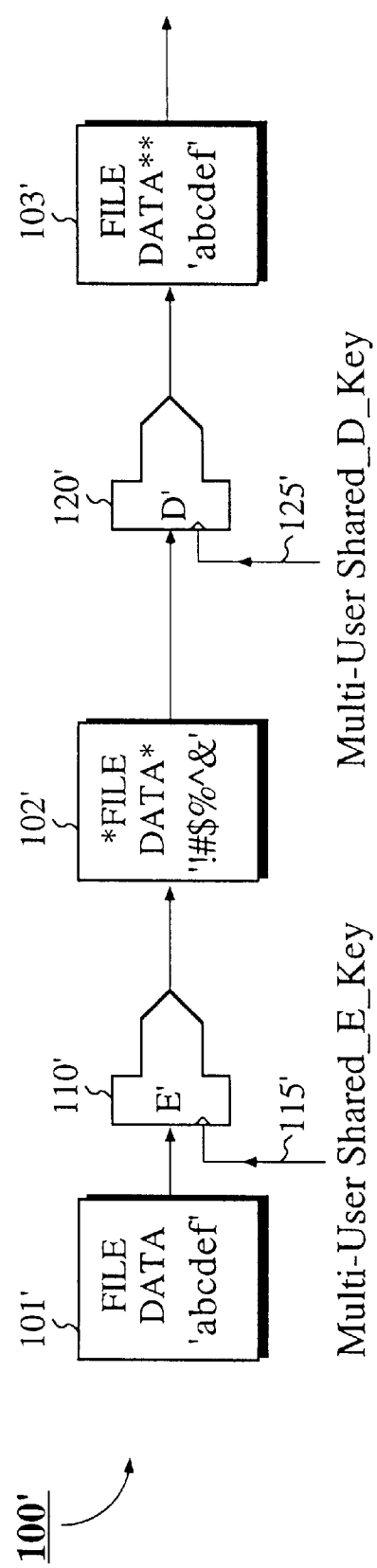

CRYPTOGRAPHIC FILE LABELING SYSTEM FOR SUPPORTING SECURED ACCESS BY MULTIPLE USERS

BACKGROUND

1. Field of the Invention

The invention relates generally to the field of securing stored digital data from unauthorized use.

The invention relates more specifically to the problem of providing an easily usable computer system that provides features such as automatic data decryption and automatic data re-encryption while operating within the context of a multi-user operating system.

The invention relates even more particularly to the problem of providing securely labeled files each with encrypted data that is intelligibly accessible to a plurality of authorized users.

2a. Cross Reference to Related Pending Applications

The following copending U.S. patent application(s) is/are assigned to the assignee of the present application, is/are related to the present application and its/their disclosures is/are incorporated herein by reference:

(A) Ser. No. 08/586,511 [Attorney Docket No. SYMA1015] filed Jan. 16, 1996 by W. D. McDonnal et al Cohen and entitled, SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME.

2b. Cross Reference to Related Patents

The disclosures of the following U.S. patent(s) is/are incorporated herein by reference:

(A) U.S. Pat. No. 4,864,616 issued Sep. 5, 1989 to E. W. Pond et al and entitled, CRYPTOGRAPHIC LABELING OF ELECTRONICALLY STORED DATA; and (B) U.S. Pat. No. 5,052,040 issued Sep. 24, 1991 to H. W. Preston et al and entitled, MULTIPLE USER STORED DATA CRYPTOGRAPHIC LABELING SYSTEM AND METHOD; and (C) U.S. Pat. No. 5,481,701 issued Jan. 2, 1996 to Lloyd. L. Chambers IV, and entitled, METHOD AND APPARATUS FOR PERFORMING DIRECT READ OF COMPRESSED DATA FILE.

3. Description of the Related Art

As knowledge of computers; and as use of computers and of digital data proliferates throughout society, the threat grows that unauthorized persons will gain useful (intelligent) access to confidential, digitized information.

A wide variety of materials may be stored in the form of digitized data and there may be many legitimate reasons for keeping in confidence, the information represented by such stored data.

By way of example, stored digital data may represent medical records of private patients. The latter records may be stored as digital data in a hospital's database computer. Each patient may wish to have his or her medical records kept in confidence by a selected one or more doctors. However, the hospital's database computer may be connected to a local or wide area communications network (LAN or WAN) so that a remotely located physician or another authorized person can quickly access the medical record of a particular patient when needed, such as in the case of a medical emergency.

For the above example, one or more security measures should be taken to maintain the expected confidentiality of the medical records by blocking unauthorized persons from gaining useful access to these medical records.

There are many other instances where security is desired. By way of further example, the to-be-kept confidential information may include private business, and/or private financial, data and plans that are digitally recorded internally within a portable (e.g., laptop) computer or on a portable disk or tape. The to-be-kept confidential information may constitute legitimate trade secrets of a company, including proprietary vendor and customer lists, technical drawings and other expressions of technology know-how digitally recorded on a computer-readable medium (e.g., on a magnetically and/or optically encoded digital tape or digital disk and/or in nonvolatile random access memory).

Unauthorized access to the media that stores the data representing such digitized information or to the data itself may come about in many ways.

A floppy diskette having the confidential information digitally recorded thereon may fall into the hands of a person who is not authorized to have such information. Such physical possession of the floppy diskette may come about either through deliberate misappropriation or by accident.

An unauthorized person may alternatively gain physical entry, either lawfully or unlawfully, into a room in which a computer terminal has been inadvertently left turned on with the last user still being 'logged-on' or otherwise having access rights as far as the operating system (OS) is concerned. If appropriate security measures are not invoked in such circumstances, the unauthorized intruder may be able to gain access to confidential data through the left-on terminal.

Unauthorized access may be otherwise achieved through a local or wide area network (LAN or WAN) by someone who chances upon a password.

In each of these or like cases, where an outer ring of security can be breached, it is desirable to maintain at least one more barrier to useful acquisition of the digitized information. To this end, many data security systems rely in part or in whole on file data encryption.

The idea is to keep confidential information in an exclusively encrypted format as much as possible so that, even if the digitized data falls into the wrong hands, it is still secured by a private encryption key.

Unfortunately, useful information is rarely kept in the encrypted state forever.

Sooner or later, one or more authorized users need to decrypt the encrypted file data in order to use its data.

Authentication of authorized users and management of passwords or keys becomes a problem when multiple users need to be given intelligent access to the information of one or more encrypted files.

If one password (and/or decryption key) is handed out to multiple users, the risk of compromise increases additively.

With each additional authorized user, there comes an additional non-zero probability of leakage of the file access password (and/or decryption key) directly or indirectly through the activities of that added user. The more authorized users there are, the higher the probability of leakage of the one password/key to an unauthorized user.

One previously-known security system (U.S. Pat. No. 4,854,616 of Pond et al) relies on a mixture of keys to reduce the risk of compromise. A label is prefixed to each file and encrypted separately from the file using a 'mandatory key' (and a checksum). The encryption algorithm is a symmetrical one, such as exclusive ORring with a key stream. The same key is used for both encryption and decryption.

The label contains auxiliary information needed for decrypting the separately encrypted file.

At the time of attempted access to the file, the label must first be symmetrically decrypted with the 'mandatory key' (and the label's checksum). The accessing user must then present a label-specified mixture of user/machine identifiers. The latter act as 'seeds' that produce secondary keys. The seed-produced secondary keys are needed to decrypt the attached file.

The secondary key-generating 'seeds' can include a Primary User ID (PID), a Secondary User ID (SID), a machine configuration (CID), and a Machine ID (MID). Failure to supply all the label-specified mixture of secondary key-generating 'seeds' during a so-called Access Check phase results in the user being denied access to the requested file.

A drawback of the Pond security system is that the same 'mandatory key' is given to all authorized users for decrypting the file label. A compromise of the 'mandatory key' unlocks the whole of the file label for examination by unauthorized entities and thereby reduces the security of the overall system.

Another drawback of the Pond security system arises when a labelled file is moved from one machine to another with proper authorization, and/or the file-holding machine is reconfigured. If the file label calls for presentation of a specific MID (machine identification code) and/or a specific CID (machine configuration specifier), the file label has to be altered to reflect the new machine or configuration each time a legitimate move is made and/or a machine configuration is altered. This can be difficult to manage in a large networked system where files and/or users are routinely moved from one machine to another and machines are routinely reconfigured.

An improvement over the Pond system is provided in U.S. Pat. No. 5,052,040 to Preston. The Preston system uses the same file labelling approach as that of Pond but extends the file label to include a user permissions area. Some users are granted full read/write access to the file contents while other users are granted only read access. The once-encrypted Pond label and the non-encrypted, user permissions extension are both symmetrically (or 'reversibly') encrypted with a DAC-seeded key stream after the Pond label has been encrypted with the mandatory key stream. The DAC seed (Discretionary Access Control seed) is generated during machine bootup.

While the Preston system is more secure in one sense—because one needs the bootup-generated DAC seed to decrypt the Preston extended-label before being able to use the mandatory key to further unlock the Pond label—the same feature is also a drawback. A file generated under the Preston system cannot be used in an off-enterprise machine that does not have access to the bootup-generated DAC seed. Thus files are not easily exchanged between different machines of an authorized user. This can be an inconvenience in an age where users likely to want to seamlessly move from one machine to another and still access the same files.

SUMMARY OF THE INVENTION

An improved, machine-implemented file labelling method and apparatus are provided in accordance with the invention for securing both file data and file label contents on a per-user basis.

Generally speaking, each authorized user employs his or her own 'private' user key (e.g., a private decryption key or a private password) to gain intelligent access to privately-encrypted portions of a file label. If the 'private' user key of one user is compromised, the usability of that one key can be programmably cancelled out from the file label without affecting the usability of the private user keys of other users. Various features in accordance with the invention are listed below.

(1) Private Decrypt of System Key for each User

One feature in accordance with the invention is that each user utilizes his or her own private user key to unlock data in a corresponding, User's Access-Control-Entries Record (User's ACER) within a file's security label. The private user key can include a private portion of a public/private key pair and/or it can include a password that is privately possessed by the user.

(2) Label-based Distribution of System Key to each User

Another feature in accordance with the invention is that the primary access key for unlocking (decrypting) an encrypted *FILE DATA* portion of a given file is distributed to authorized users by way of the attached label portion.

(3) Label-based Collection of Requests for System Key Distribution to Not-yet-authorized Users Another feature in accordance with the invention is that not-yet-authorized users can submit requests by way of the attached label portion for private receipt of the primary access key for unlocking (decrypting) a correspondingly encrypted *FILE DATA* portion of a given file. To this end, if the label is covered by a digital signature, an extension buffer zone is provided in the label for receiving the requests of the not-yet-authorized users and the extension buffer zone is not covered by the digital signature.

(4) Label-based Distribution of Label-use Rights to each User

Another feature in accordance with the invention is that label-use rights (such as the right to modify the label) are individually distributed to authorized users by way of the label.

Other features and aspects of the invention will become apparent from the below detailed description.

BRIEF DESCRIPTION OF THE DRAWINGS

The below detailed description makes reference to the accompanying drawings, in which:

FIG. 1A is a block diagram showing a previously known, public_key/private_key, asymmetric encryption/decryption system;

FIG. 1B is a block diagram showing a previously known system in which multiple users share possession of one or more system keys for either symmetric or asymmetric encryption and decryption;

DETAILED DESCRIPTION

Figure 2:
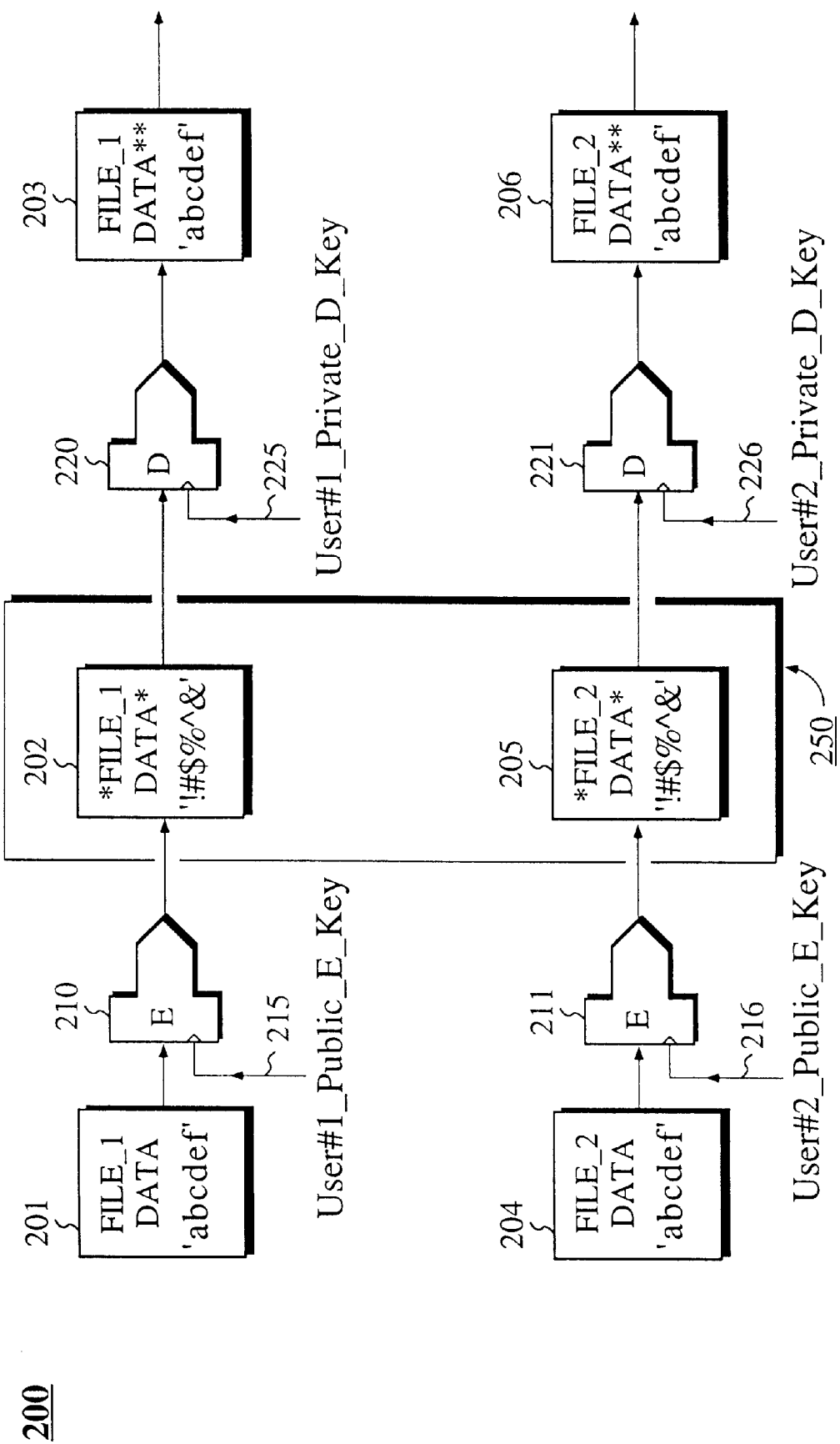
FIG. 2 is a block diagram showing how privately-decryptable files might be stored in a common memory or passed through a common communications channel.

FIGS. 1A and 1B provide a basic introduction to the topics of file encryption/decryption and management of encryption/decryption keys. FIGS. 1A and 1B also introduce drawing symbols that are used in FIG. 3. Those skilled in the art may choose to quickly glance at FIGS. 1A and 1B and then skip forward to the discussion of FIG. 2. Referring to FIG. 1A, a first system 100 is shown that relies on the public-key/private-key paradigm. The RSA public-key/private-key system is an example.

First file data 101 is provided in plaintext form (e.g., 'abcdef') for storage in a nonvolatile, computer-readable media (e.g., on a magnetic floppy diskette) or for transmission through a non-secured transmission channel (e.g., over the Internet or another non-secured network).

A first encrypting unit (E_unit) 110 receives digital signals representing the plaintext version (e.g., 'abcdef') of the first file data 101 at one input. A 'public' encryption key (E_Key) 115 is applied to a second input of E_unit 110. The first encrypting unit 110 uses the public_E_Key 115 to encrypt first FILE DATA 101 and to thereby produce encrypted second *FILE DATA* 102 (e.g., '!#$%^&'). The encrypted second *FILE DATA* 102 is essentially unintelligible (e.g., '!#$%^&') and its deciphering generally calls for access to a soon-described 'private' decryption key (D_key).

For sake of convenience, data that has been once-encrypted is denoted herein as bounded between a pair of asterisks. An example is, *FILE DATA* 102 as shown in FIG. 1A.

Intelligently useful data that has been obtained by decrypting pre-encrypted data is denoted as adjacent to, but outside, a pair of asterisks. An example is, FILE DATA** 103 as shown in FIG. 1A.

The encrypted *FILE DATA* 102 may be recorded as such in a computer-readable media and/or transmitted over a publicly-accessible transmission channel.

When intelligible use of the *FILE DATA* 102 is desired, signals representing the *FILE DATA* 102 are delivered to a first input of a first decrypting unit (D_unit) 120. A "private" decryption key (D_key) 125 is supplied to a second input of the first decrypting unit 120. The combination of an asymmetric decryption algorithm (e.g., RSA) carried out by the D_unit 120 and the private D_key 125 operates on the encrypted *FILE DATA* 102 to produce decrypted FILE DATA 103. This FILE DATA 103 is usable in the same way as the original FILE DATA 101. The act of decrypting the encrypted *FILE DATA* 102 is occasionally referred to herein as 'uncovering' or 'unlocking' such *FILE DATA* 102.

Decryption key 125 is referred to as a user's "private" decryption key because only one user and his or her trusted agents are intended to be given possession of this D_key 125.

The user's "public" encryption key (E_key) 115 may be handed out to any member of the public. The user's private D_key 125 cannot be easily derived from the user's public E_key 115. Thus, after a general member of the public employs a user's public E_key 115 to create the encrypted *FILE DATA* 102, only that user (and his or her trusted agents) can easily decrypt (unlock) the resultant *FILE DATA* 102 to produce the plaintext replica, FILE DATA** 103.

First system 100 is referred to as an asymmetric encryption/decryption system because the same key is not usable for both encryption and decryption. An example of such a public key/private key asymmetric system is the RSA public/private algorithm available from RSA Data Security, Inc.

The most common use for a public-key/private-key system 100 is where a first user wishes to send a message in confidence, over a publicly-accessible communications channel (e.g., 102) to a second user. The first user obtains the public E_key 115 of the second user and encrypts the original message 101. On receipt, the second user applies his or her private D_key 125 to decrypt the received *FILE DATA* 102 and thereby intelligibly access the information contained therein.

An advantage of the public-key/private-key system 100 is that users can freely hand out their public key without worrying about who has possession of this public key 115. Users are each responsible for maintaining the confidentiality of their own private key 125. Thus, third parties (such as a system administrator) do not need to become involved in the controlled distribution of encryption and decryption keys. (As an aside, although FIG. 1A shows a system where there is a 'public' E_key and a 'private' D_key, it is to be understood that a 'private' E_key may be used for encryption and that a companion 'public' D_key may be used for decryption. In this latter case, the user's public D_key is used to authenticate that user was the transmitter of the information originally encrypted with that user's private E_key. In some systems, a same public key functions as both the public E_key and the public D_key while a different private key functions as both the private D_key and the private E_key.).

A second kind of encryption/decryption system 100' is shown in FIG. 1B. Like reference numerals are used in FIG. 1B for elements corresponding to those of FIG. 1A. As such, a detailed description is not provided.

One difference between the second system 100' (FIG. 1B) and the first system 100 (FIG. 1A) is that the encryption and decryption keys, 115' and 125', of the second system 100' are each multi-user shared keys. This means that multiple users have possession of the encryption key 115' and multiple users have possession of the decryption key 125'. No key is privately held by one user (and his/her trusted agents, if any).

In so-called "symmetrical" encryption/decryption systems, the multi-user shared E_key 115' is the same as the multi-user shared D_key 125'. Examples of symmetrical encryption/decryption systems include, but are not limited to: (1) XORring with a randomly-generated key stream, (2) X_NORring with a randomly-generated key stream, (3) DES (the U.S. Government-sponsored Data Encryption Standard), (4) Triple-DES (5) RSA RC4™, and (6) Blowfish, the latter being attributed to Bruce Schneier.

The problem with the second system 100' (FIG. 1B) is, as already explained above, that the risk of compromise of a shared encryption key 115' and/or a shared decryption key 125' increases as more users are given possession of that key. A system administrator often has to become involved in the secured distribution of the shared E_ and D_keys to the various users who are to be authorized to respectively perform encryption and/or decryption with those keys.

There is however one advantage that the second system 100' of FIG. 1B has over the public/private key-pairing system 100 of FIG. 1A. The advantage is that the same encrypted *FILE DATA* 102' does not have to be stored and/or retransmitted a plurality of times, with each such storage or transmission process being dedicated to a unique user. Shared *FILE DATA* 102' can be worked on (or worked off of) by a group of access-sharing users. This facilitates so-called groupware projects wherein multiple users contribute to the contents of a single file. Where appropriate, the shared *FILE DATA* 102' can be simultaneously broadcast to a group of access-sharing users over a network or by other broadcast means (e.g., from a space satellite).

FIG. 2 shows a possible alternative 200 to the key-sharing system 100' of FIG. 1B. In the multi-user public-key/private-key system 200 of FIG. 2, box 250 represents a computer-readable storage media (e.g., a magnetic or optical disk) which is accessible to multiple users.

As seen in FIG. 2, the plaintext version of FILE_1 DATA 201 is encrypted (locked) according to the encryption algorithm of encrypting unit 210 and further according to a supplied User_#1 Public_E_key 215 to thereby securely store the encrypted version *FILE_1 DATA* 202 in the commonly-accessible data-conveying media 250.

A companion decrypting unit 220 and a companion User_#1 Private_D_key 225 are needed for easily obtaining the decrypted version, FILE_DATA** 203 from the commonly-accessible data-conveying media 250.

Similarly, the plaintext version of FILE_2 DATA 204 is encrypted with the algorithm of encryption unit 211 and with a supplied User_#2 Public_E_key 216 to thereby form the encrypted information of *FILE_2 DATA* 205. *FILE_2 DATA* 205 is then stored into the commonly-accessible data-conveying media 250. The decryption algorithm of companion decryption unit 221 and the corresponding User_#2 Private-D_key 226 is required for easily reconstituting the plaintext, FILE_2 DATA** 206 from the commonly-accessible data-conveying media 250.

The advantage of system 200 is that the decryption keys, 225 and 226, are kept privately by their respective users (User_#1 and User_#2). The likelihood of compromise is lessened as compared to the key-sharing system 100' of FIG. 1B. If the User_#1 Private-D_key 225 is compromised, then only *FILE_1 DATA* 202 is put at risk. *FILE_2 DATA* 205 remains secure. The drawback of system 200 (FIG. 2) is, as explained above, that it makes it difficult for multiple users to share intelligible access to a common data file.

Figure 3:
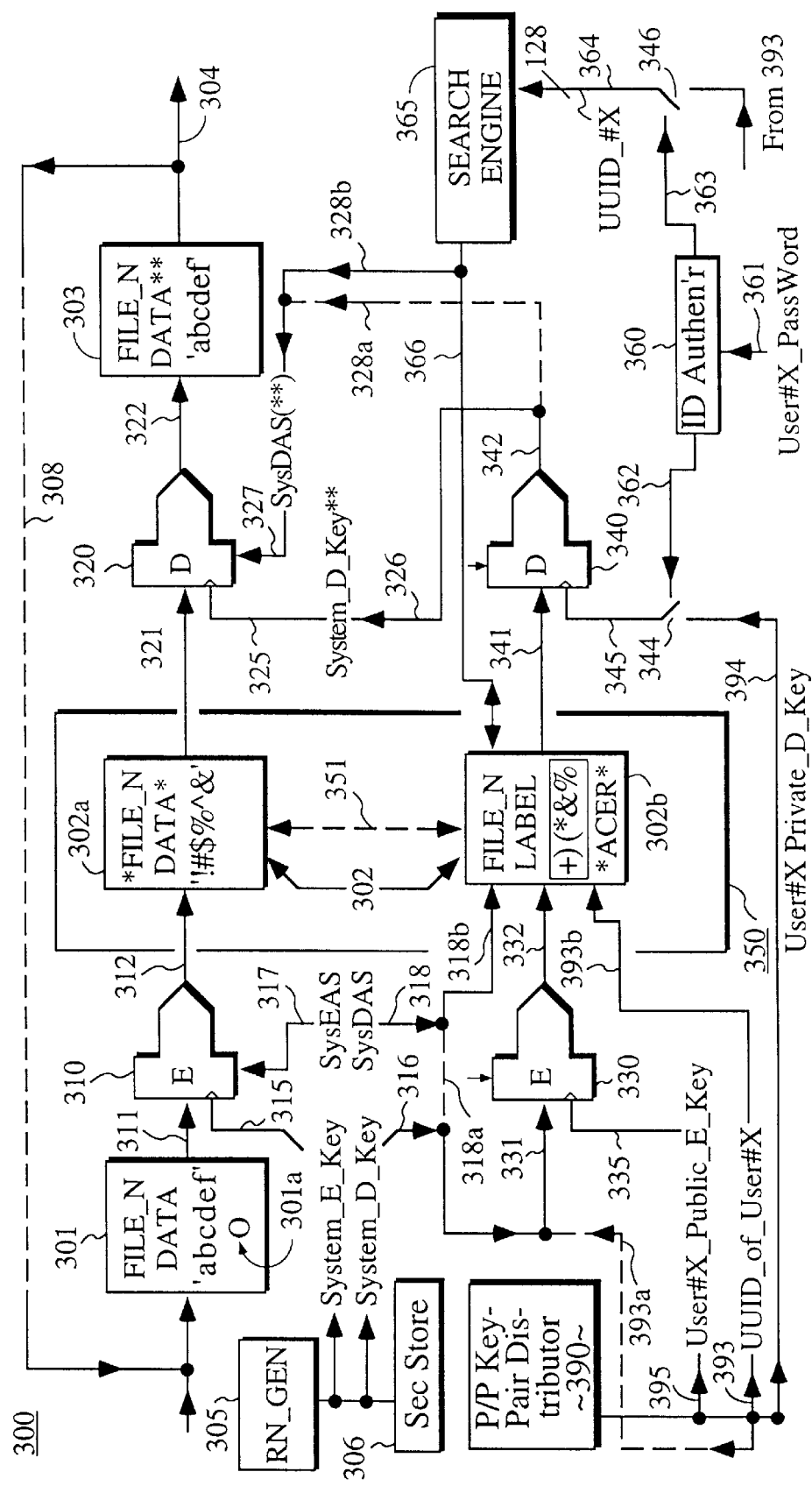
FIG. 3 shows a file labelling system in accordance with the invention.

FIG. 3 shows a system 300 in accordance with the invention. System 300 provides the advantages of a public/private key-pairing system (hereafter, also referred to as a 'P/P-pairing system') and at the same time allows multiple users to securely share intelligible access to a common data file, 302.

In system 300, a file label 302b is prefixed to, or otherwise attached to, or otherwise associated with a correspondingly-encrypted file data portion 302a. The combination of file data portion 302a and file label 302b is referred to here as a by-the-user secured *FILE_N* 302. Dashed line 351 represents the logical attachment or other logical association of the *FILE_N DATA* portion 302a with the FILE_N LABEL portion 302b. As a general rule, both the *FILE_N DATA* portion 302a and the FILE_N LABEL portion 302b are carried (e.g., stored) in a commonly-accessible data-conveying means 350. If the *FILE_N DATA* portion 302a is moved elsewhere, the FILE_N LABEL portion 302b travels with it. The commonly-accessible data-conveying means 350 can include a magnetic disk or an optical disk, or a magneto-optical disk, or a data storage tape, or another such form of data storing and/or conveying means, that makes its carried data signals accessible to a plurality of users by a variety of pathways. The commonly-accessible data-conveying means 350 can alternatively or additionally include a transmission means for transmitting the *FILE_N DATA* portion 302a and the FILE_N LABEL portion 302b over a digital data communications network or a like data transmission means.

As seen in FIG. 3, signals 311 representing the plaintext version, FILE_N DATA 301 are encrypted by a first encrypting unit (E_unit) 310. First E_unit 310 can carry out a selectable one of a plurality of encryption processes such as, but not limited to: (1) XoRring the original signals 311 with a randomly-generated key stream, (2) X_NORring with a randomly-generated key stream, (3) performing according to the U.S. Government-sponsored Data Encryption Standard (DES), (4) performing Triple-DES, (5) performing RSA RC4™, (6) performing RSA RC5™, and (6) carrying out the Blowfish algorithm. The selected encryption algorithm is defined by a System-supplied Encryption Algorithm Select signal (SysEAS) 317.

The SysEAS-selected encryption-algorithm of first E_unit 310 uses a System-supplied Encryption key (System_E_key) 315 for generating the encrypted *FILE_N DATA* portion 302a. The latter portion 302a is thereafter transmitted to the commonly-accessible data-conveying means 350.

The System_E_key 315 is preferably generated initially by a system-contained random number generator 305 and thereafter stored in an administrator-controlled secure storage means 306 (e.g., a nonvolatile storage area whose contents are encrypted with an administrator's public E_key and afterwards decryptable only with the administrator's closely-guarded private D_key.

If desired, the SysEAS signal 317 may also be initially generated by the same or another random number generator 305 and the generation of the System_E_key 315 may be tailored accordingly. After its initial generation, the SysEAS signal 317 may also be stored in the administrator-controlled secure storage means 306 if desired.

At the time that the random number generator 305 produces the System_E_key 315, a companion decryption key (System_D_key) 316 is also produced.

At the time that the SysEAS signal 317 is produced, a companion System-supplied Decryption Algorithm Select signal (SysDAS) 318 is also produced. Select signal, SysDAS 318, specifies the decryption algorithm that is to be used for decrypting the *FILE_N DATA* portion 302a.

After its initial generation, the System_D_key 316 is preferably stored in the secure storage means 306. After its initial generation, the SysDAS signal 318 may also be stored in the secure storage means 306. In cases where the System_D_key 316 is the same as the System_E_key 315 (in symmetrical encryption/decryption systems), key 316 obviously does not have to be stored in secure storage means 306 after key 315 is stored in the same secure storage means 306. In cases where the SysDAS signal 318 is the same as the SysEAS signal 317, the second signal 318 does not have to be stored in secure storage means 306 after the first signal 317 is stored in the same secure storage means 306.

In one species of the invention, the selectable system encryption algorithms provided by first E_unit 310 are symmetrical (reversible) ones such as exclusive-ORring or exclusive-NORring of the plaintext message with an encrypting keystream. In such a case, the System_E_key 315 is the same as the System_D_key 316. (And although not shown, in such a case line 315 may connect directly to line 316 in FIG. 3.) The SysDAS signal 318 may, but does not have to, be equal to the SysEAS signal 317.

In another species of the invention, at least one of the encryption algorithms carried out by first E_unit 310 is part of a non-symmetrical (non-reversible) encryption/ decryption pair such as RSA public/private key-pairing. In such a case, the System_D_key 316 is not the same as the System_E_key 315 and appropriate measures are taken to relay the companion System_D_key 316 through a soon-described E_unit 330 for later retrieval by authorized users. The SysDAS signal 318 may, but does not have to, be equal to the SysEAS signal 317 in this asymmetrical case.

The supplied System_D_key signal 316 is placed on a plaintext-receiving, first input 331 of a second encrypting unit (E_unit) 330 for encryption thereby. In one embodiment, the SysDAS signal 318 is routed as indicated by 318a to be combined with the System_D_key 316 and also placed on first input 331. In another embodiment, the SysDAS signal 318 is routed as indicated by 318b and supplied in plaintext form to the FILE_N LABEL portion 302b. If system performance speed is a priority over security, the 318b path is preferred.

Figure 4:
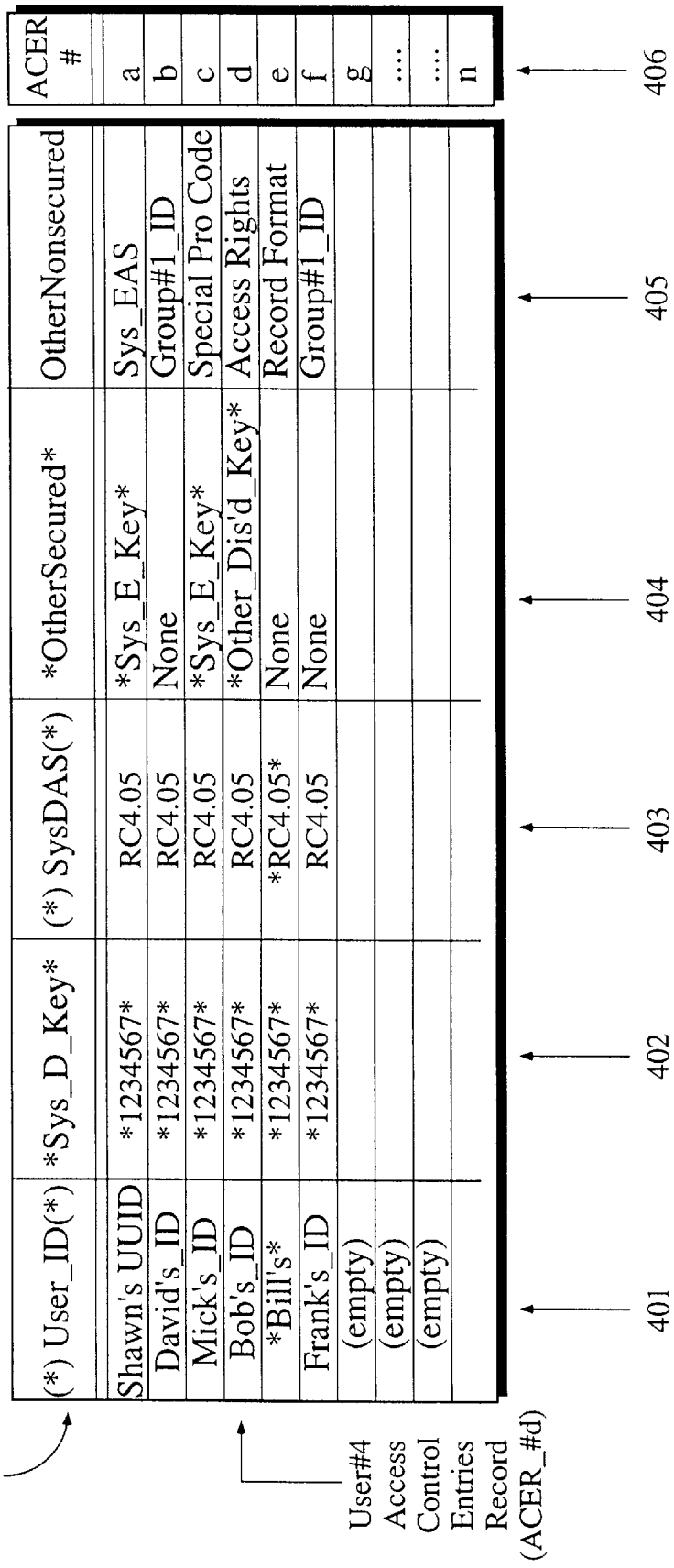
FIG. 4 shows one data structure for an Access Control Table (ACT) having individual User's Access-Control-Entries Records in accordance with the invention.

The second E_unit 330 is preferably part of a public/private key-pairing system (P/P-pairing system), 330/340. For each User_#X (where X=1, 2, 3, . . . , etc.), the public encryption key of that User_#X is placed on a key-receiving input (>) 335 of second E_unit 330 and that key is used for encrypting the signals, 316 and optionally 318a, 393a, that are present on the plaintext-receiving, first input 331 of second E_unit 330. The resulting, encrypted signal 332 is recorded into a User_#X-accessible, Access-Control-Entries Record (*ACER*) within FILE_N LABEL portion 302b. FIG. 4 shows one possible data structure for an *ACER* which will be discussed shortly.

The User_#X public E_key that is applied to the key-input 335 of second E_unit 330 is obtained from a public/private key-pair distributing unit 390 (hereafter also, 'P/P key-pair distributor 390'). P/P key-pair distributor 390 is a machine-implemented entity that supplies a Unique User Identification signal (UUID) 393 for each User_#X at the same time that it supplies the public E_key 395 of that user number X.

In one embodiment, the UUID 393 that is produced by unit 390 moves along path 393b for storage in plaintext form within the ACER of User_#X. In another embodiment, the UUID signal 393 moves along path 393a for encryption by second E_unit 330. Path 393b is preferred for performance speed reasons and is therefore shown as a solid line in FIG. 3.

In one asymmetric embodiment, where the System_E_key 315 is not the same as the System_D_key 316, a plaintext copy of the System E_key 315 is obtained from the secure storage means 306 and applied to the first input 331 of second E_unit 330 for inclusion as ciphertext within the *ACER* of appropriately authorized users. If the SysEAS signal 317 is not the same as the SysDAS signal 318, that too may be applied to the first input 331 of second E_unit 330 for inclusion as ciphertext or plaintext within the *ACER* of appropriately authorized users (e.g., those users who are authorized to modify the contents of *FILE_N DATA* portion 302a).

When a specific User_#X wishes to intelligibly read the encrypted *FILE_N DATA* portion 302a, that User_#X is asked to first perform an identity-authenticating task (e.g., supply his or her password). The identity-authenticating task causes his or her private decryption key (D_key) to be supplied a key-input 345 of decrypting unit 340. D_unit 340 is the decryption companion of second E_unit 330. The ciphertext-receiving input 341 of D_unit 340 receives the *ACER* entries that had been encrypted with that user's Public_E_key 395 and stored in FILE_N LABEL portion 302b.

When the proper private decryption key 394 of User_#X is supplied to key-input 345, decrypting unit 340 produces at its output 342, a usable System_D_key 326 which is a replica of the original System_D_key 316. The produced System_D_key 326 is then applied to key-input 325 of decrypting unit (D_unit) 320. D_unit 320 is the decryption companion of E_unit 310.

In the one embodiment where the SysDAS signal 318 takes path 318b, the label-stored copy of that signal is extracted as SysDAS signal 328b and applied to the decryption algorithm select terminal 327 of D_unit 320.

In the other embodiment where the SysDAS signal 318 takes path 318a, the label-stored ciphertext copy of that signal is passed through D_unit 340 and extracted as SysDAS signal 328a from output 342 of D_unit 340. The extracted SysDAS signal 328a is then applied to the decryption algorithm select terminal 327 of D_unit 320. The notation 'SysDAS()' is used in FIG. 3 to indicate that this signal can be either the SysDAS signal 328a or the SysDAS signal 328b depending on what path, 318a or 318b, was taken in the creation side of the FILE_N LABEL portion 302b.

The privately decrypted System_D_key signal 326 and the extracted SysDAS() signal 328b (/328a) are respectively supplied to the key-input and decryption algorithm select input ports, 325 and 327, of decrypting unit 320.

The ciphertext-input port 321 of D_unit 320 receives the *FILE_N DATA* portion 302a from the commonly-accessible data-conveying means 350 and decrypts the received signal to thereby produce the plaintext replica, plaintext version, FILE_N DATA 303**.

Once obtained, the decrypted FILE_N DATA signals 303 may be stored in computer-readable memory (e.g., volatile RAM) or otherwise privately used by the authorized User_#X as desired. Such use is generally indicated by path 304**.

If User_#X is authorized to modify the data within the *FILE_N DATA* portion 302a of commonly-accessible data file 302, then User_#X is given access to the System_E_key 315. After modification, the data of pre-decrypted portion 303 is conveyed by path 308 and becomes the data of portion 301. The modification-authorized user may then obtain the System E_key 315 and the SysEAS signal 317 from the secure storage means 306.

In the embodiment that employs a symmetrical encryption/decryption system 310/320, it is possible to avoid the step of obtaining the System_E_key 315 from the secure storage means 306. The SysDAS() signal 328b (/328a) is a replica of the System E_key 315 and thus User_#X is inherently given possession of the System_E_key 315** by his/her prior, private decrypting of his/her corresponding *ACER* (User's Access-Control-Entries Record).

If a non-symmetrical encryption/decryption system is defined by first E_unit 310 and D_unit 320, the System_E_key 315 would have to be distributed to the authorized User_#X by a secured channel. The User's Access-Control-Entries Record (*ACER*) can function as one such channel for distributing the System_E_key 315 to authorized users. Alternatively, the authorized User_#X may have go to the secure storage means 306 and fetch a plaintext version of the System_E_key 315 from there. The embodiment wherein modification-authorized user obtains a decrypted replica System_E_key of key 315** from his/her *ACER* is described below with reference to FIG. 4.

As indicated above, the conveyance of a user's private D_key 394 to key-input 345 generally calls for the performance of an identity-authenticating task by that user. In one embodiment, User_#X is asked (e.g., by an on-screen dialog box) to enter or otherwise input his/her password (e.g., through the terminal keyboard). The submitted password signal is applied to password-input port 361 of identity-authenticating unit 360. If a proper password signal for that logged-in user is submitted, the identity-authenticating unit 360 sends release signals to the P/P key-pair distributor 390 for causing distributor 390 to supply that user's private D_key 394 to key-input 345 and for further causing distributor 390 to supply that user's UUID signal 393 to a UUID-input port 364 of a label-searching engine 365. The password-based release of the user's private D_key 394 and of the user's UUID signal 393 is depicted by release switches 344 and 346 respectively in FIG. 3.

In one embodiment, each user's UUID signal 393 is at least 40 bits long and more preferably 128 bits long or longer. It can be shorter if desired.

In one embodiment, the sum length of each user's private D_key 394 and of that user's public E_key (the key-pair length) is preferably in the range of approximately 360 bits to 2048 bits and more preferably it is equal to approximately 768 bits or more.

The System_D_key 316 is preferably at least 40 bits long and more preferably 128 bits long or longer. It can be shorter if desired.

Each user's pair of private D_and public E_keys, 394/395 is preferably defined by a pseudo-random number generator so that this key-pair is essentially random with the exception that this key-pair is not equal to or otherwise substantially too close to another user's private/public key-pair and that the key values are relatively prime numbers.

Each user's UUID signal 393 is preferably defined by a pseudo-random number generator so that this UUID is essentially random with the exception that this UUID is not equal to or otherwise substantially too close to another user's UUID and is thus unique. Each user's UUID signal 393 is generally a nonsensical, relatively-long bit stream that is hard to guess or remember. In one embodiment, a plaintext copy of the user's name is combined at the time of UUID creation with the current date and the current time (down to at least the latest second) and hashed to generate the pseudo-random UUID.

Upon receipt of a released user's UUID signal 393, the label-searching engine 365 scans the *ACER*'s within FILE_N LABEL portion 302b for an *ACER* having a matching UUID string. The scanning connection is generally indicated by line 366 of FIG. 3. If users' UUID's follow path 393a during the formation of each *ACER*, then the label-searching engine 365 scans for matching UUID's by obtaining plaintext from the output 342 of D_unit 340. This latter approach is less preferred, as explained above, because it slows down file access speed. The preferred implementation is to store UUID's as plaintext in the *ACER*'s.

When a matching UUID is found, label-searching engine 365 (or another responsive means) causes the corresponding *Sys_D_key* signal from the ACER of the matching UUID to pass through D_unit 340 and the resultant System_D_key** 326 signal to be supplied to input 325 of D_unit 320.

FIG. 4 illustrates one data structure that may be used within the FILE_N LABEL portion 302b of FIG. 3. The illustrated Access Control Table (ACT) 400 is shown with aligned columns 401–405 for the entries of each User's Access-Control-Entries Record (ACER) so that the functionality of each type of entry can be easily appreciated. In actual use, the entries of each User's Access-Control-Entries Record may be positioned variably as appropriate. Column 406 does not have to be part of the ACT 400 but is illustrated for ease of cross referencing to specific records, a, b, c, . . . , n.

Pairs of asterisks are used to indicate the presence of ciphertext as before. Data that is encrypted is denoted herein as bounded between a pair of asterisks. Each *Sys_D_key* entry (column 402) of each User_#X's ACER, for example, is encrypted with that user's public E_key, such that only that user (and his/her trusted agents, if any, who are given possession of his/her private D_key) can easily generate the System_D_key** signal 326 by reading the corresponding ACER and by decrypting the included *Sys_D_key* entry 402. Replicas of the original System_D_key 316 are thus securely distributed to each authorized user (and his/her trusted agents, if any, who are given possession of his/her private D_key or corresponding password).

It is to be understood that although the plaintext string '1234567' is seen in FIG. 4 bounded between asterisks for each record of the *Sys_D_key* column 402, this is done for sake of appreciation of the invention. In actual practice, the *Sys_D_key* entry 402a–n of each respective ACER_#a through ACER_#n should be a different, nonsensical, 40 bit or longer string of 1's and 0's. Each such string is decrypted into the plaintext System_D_key** 326 (e.g., '1234567') with the private D_key of the associated user.

By way of a more detailed illustration, consider the entries of the fourth Access-Control-Entries Record which is denoted as ACER_#d. The user associated with this ACER_#d is named "Bob". A first access control entry (ACE) 401d associates the present ACER_#d with the user named Bob by way of a unique user identification string (e.g., Bob's UUID) or by way of other appropriate means. Each User_ID entry 401a–n may be encrypted or not. This option is denoted by the optional-encryption indicators (*) . . . (*) formed about the column header, (*)User_ID(*). The encrypted version, *User_ID* is used if path 393a is followed in FIG. 3. The plaintext version, User_ID is used if path 393b is followed in FIG. 3. Use of the plaintext version of User_ID is preferred if speed is of primary concern because the D_unit 340 takes time to decrypt each privately encrypted portion of data. In this particular example, Bob's User_ID is his UUID string. This UUID string is not encrypted with Bob's private key and appears as plaintext. Although the entry 401d shows as "Bob's_ID" in FIG. 4, it is to be understood that in actual use the UUID entry 401d will often be a nonsensical, 40 bit or longer string of 1's and 0's.

By way of contrast and for completeness, Bill's User_ID 401e is encrypted by Bill's private E_key and is shown to have the form, *Bill's*. As indicated above, this approach is less preferred if Bill's User_ID is his UUID string because the latter is essentially nonsensical in the first place and because resort to unnecessary encryption and decryption consumes time as well as system resources. If Bill's User_ID were his name in ASCII format rather than his UUID string, and it was desirable to keep the identities of authorized users of a given FILE_N LABEL portion 302b confidential, then in such a case it may be desirable to encrypt each User_ID with that user's public E_key. In the latter case, the *User_ID* entry would be decrypted by D_unit 340 before being submitted to input 366 of label-searching engine 365 for comparison with the released UUID signal 393 at UUID-input port 364.

Although FIG. 4 shows column 401 denoted as 'User_ID', it is within the contemplation of the invention to more broadly define this column 401 as 'ACER_ID' and to have randomly-generated passwords stored in one or more entries of column 401. These ACER_ID passwords can be given to 'generic' users for locating respective ACERs that each contains an *Sys_D_key* signal covered by a corresponding encryption algorithm. The key that uncovers the *Sys_D_key* signal of each such generic ACER is referred to as that ACER's private key rather than as the private key of a particular user. This aspect is further discussed for field 552 of FIG. 5B.

Still referring to FIG. 4, a third entry 403a–n of each ACER preferably contains an indicator of the System Decryption Algorithm Selection signal (318). The header of column 403 is indicated as (*)SysDAS(*). Again, encryption with the user's public E_key is optional and less preferred. Thus most of the illustrated entries of column 403 show the plaintext 'RC4.05' (to indicate as a fictitious example, version '0.05' of the RSA RC4™ algorithm). Although the plaintext name of the decryption algorithm is seen in FIG. 4, in actual use that entry would generally be a coded value selected from a group such as 0 through 6, with each value representing a specific, predefined decryption algorithm. There is no significant, added benefit to encrypting that value with the user's public encryption key (395). However, if added security were desired along this line, the entries of column 403 could be each so encrypted so that only those who possess the user's private decryption key (345) are able to easily obtain the plaintext version of the stored *SysDAS* signal from that user's ACER. In the latter case, paths 318a and 328a would be followed in FIG. 3. Entry 403e of FIG. 4 (row e, column 403) indicates this optional configuration.

Referring to columns 404 and 405, each Access-Control-Entries Record may have additional entries that are either encrypted (404) or not (405) with that user's public E_key or with some other encryption key.

By way of example, suppose the encryption/decryption system 310/320 is asymmetric and the user named, Shawn is to be permitted to modify the *FILE_N DATA* portion 302a by following the route 308 described above. In such a case, Shawn has to be given some way of applying the System_E_key to input 315 of first E_unit 310 and of applying the SysEAS signal to input 317 of that E_unit 310.

One way of securely distributing the asymmetric System E_key 315 that was used for *FILE_N DATA* portion 302a to Shawn (and to his trusted agents, if any, who are given possession of his private D_key and/or passwords) is by placing an encrypted version (*Sys_E_Key*) of that System_E_key 315 in the FILE_N LABEL portion 302b. This encrypted version (*Sys_E_Key*) is covered by Shawn's public E_key and placed in Shawn's ACER as indicated at entry 404a. The Sys_EAS code (the System-supplied Encryption Algorithm Select signal) can be passed to Shawn through his ACER either as the illustrated, non-secured entry 405a; or if more security is desired, as another public E_key covered item of the form *Sys_EAS* (not shown in FIG. 4).

By way of further example of the kinds of additional data that might be passed through a given ACER, suppose that the ACER's of certain individuals (Mick for example) are to be processed in a special way by an application program that refers to that ACER. A special-processing request code (Special Pro Code) may be included in either plaintext form or ciphertext form in a respective one of areas 405 and 406. Such an example is shown generically at entry number 405c.

One example of special processing on a per-ACER basis (405c) is defining how the contents of the given ACER are to be displayed (or hidden) when queried by various users. (See also the below discussion of field 555.)

One further example of special processing on a per-ACER basis (405c) is the granting of different access rights to various portions of a given data file 302 (FIG. 3). Some individuals may be authorized (e.g., by a system administrator) to have read-only access to *FILE_N DATA* portion 302a and no read or write access to FILE_N LABEL portion 302b. Some individuals may be authorized to have read and write access to *FILE_N DATA* portion 302a but read-only access to FILE_N LABEL portion 302b. Yet other individuals may be authorized to have read and write access to both the *FILE_N DATA* portion 302a and the FILE_N LABEL portion 302b of a given FILE_N 302. Inclusion of such access-rights code is shown at entry number 405d.

Some users may need to know that they belong to a particular "group" of users as specially defined with respect to this given FILE_N 302. Inclusion of such a group-association code is shown at entry numbers 405b and 405f. David and Frank are associated through their respective ACER's to a Group#1 in so far as the given FILE_N 302 is concerned. One reason may be that they need to collaborate on work on a particular section of the given FILE_N. More generically, entry 405b may be viewed as a group identifying code for specifying a group of ACER's or a group of users to which the respective ACER or respectively-associated user belongs.

By way of further example of the kinds of additional data that might be passed through a given user's ACER, suppose that within the so-called, plaintext version of the FILE_N DATA 301 there was nonetheless a small, 'buried' ciphertext portion 301a that is covered by an E_key distinct from the keys applied to 315 and 335. Suppose this 'buried' ciphertext portion 301a is to be intelligibly accessed by only a subset of the authorized users who are authorized to access the remainder of *FILE_N DATA* portion 302a. The D_key for decrypting this 'buried' ciphertext portion 301a can be distributed to the subset of the authorized users through their respective ACER's in the same way that the System_D_key 316 is distributed to all the authorized users. For each member of the subset of the authorized users, the D_key for the 'buried' ciphertext portion 301a is covered (encrypted) by the respective public E_key of that member and the result is stored as *Other_Dis'd_Key* (Other Distributed Key) in that member's ACER. Inclusion of such a privately-covered *Other Distributed Key* is shown at entry number 404d by way of example.

Each user's ACER record may have its own uniquely formatted extension portion. The extension portion may be provided for holding special entries that are not regularly found in most of the system's ACER's. The use of special extensions works to conserve storage space by not unduly extending the size of most ACER's for entries that are not generally used. The format specification for a specially-extended ACER may be provided in a Record_Format entry such as shown at 405e. If extra security is desired, an encrypted version, *Record_Format* (not shown) may be instead stored in the *Other_Secured* area 404.

Figure 5A:
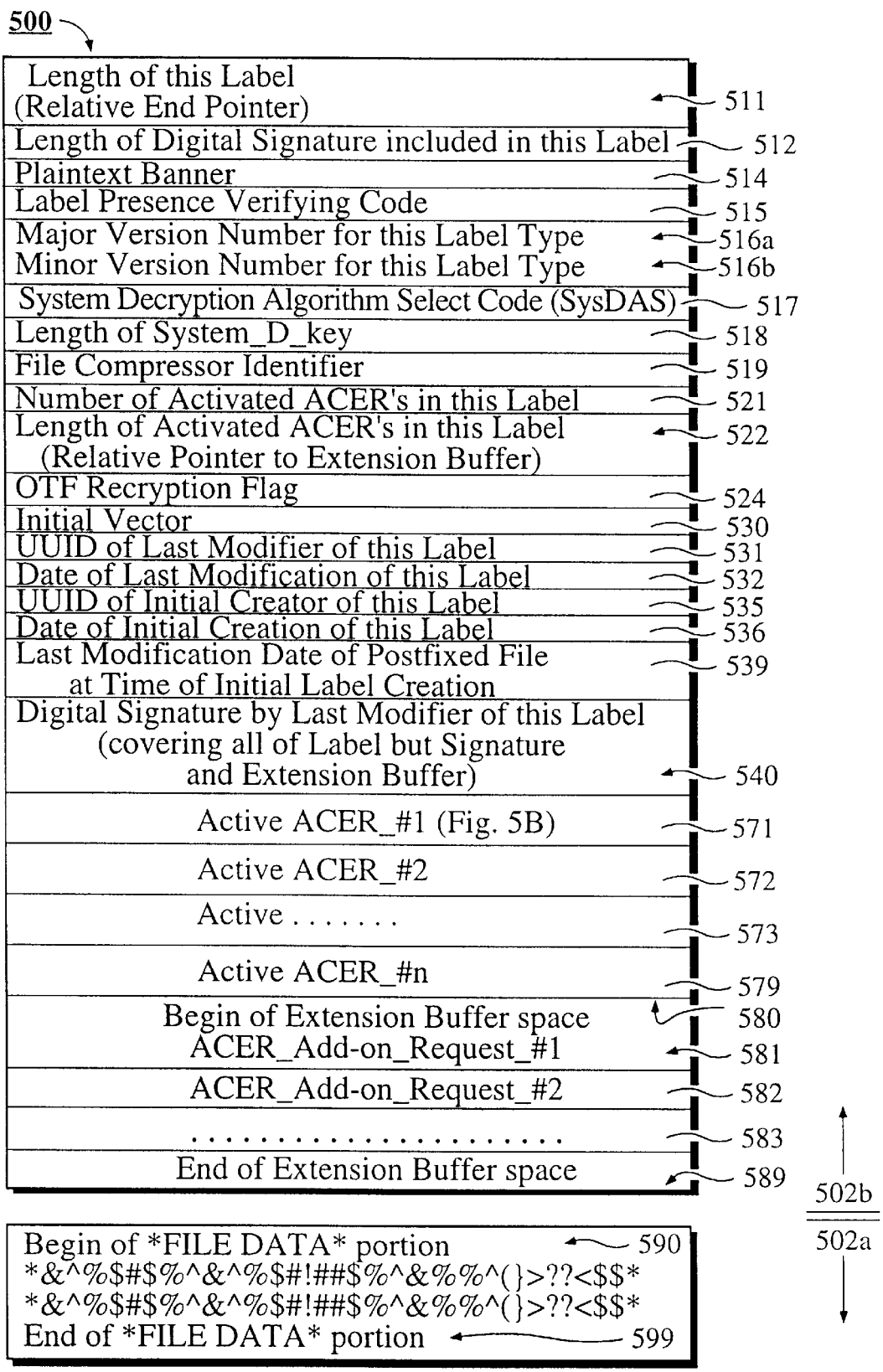
FIG. 5a shows a second data structure for a file in accordance with the invention.

FIG. 5A shows one example in accordance with the invention of a data structure 500 for a FILE LABEL portion 502b and for a postfixed *FILE DATA* portion 502a of a stored file 502 in accordance with the invention. When physically implemented, data structure 500 may be recorded on a machine-readable medium such as magnetic disk (not shown) and appropriately encoded for functional use by a prespecified, data-processing means (e.g., a targeted, digital computer that has been programmed to cooperate with the various portions of data structure 500 as indicated). The machine-readable medium (e.g., disk) is operatively coupled to the prespecified, data-processing means for cooperating therewith in accordance with the indicated functions of the data structure 500.

Data structure 500 may additionally or separately be physically transmitted through a transmission medium (e.g., over a digital communications network) for receipt and intelligible use by a targeted data-processing means.

Figure 5B:
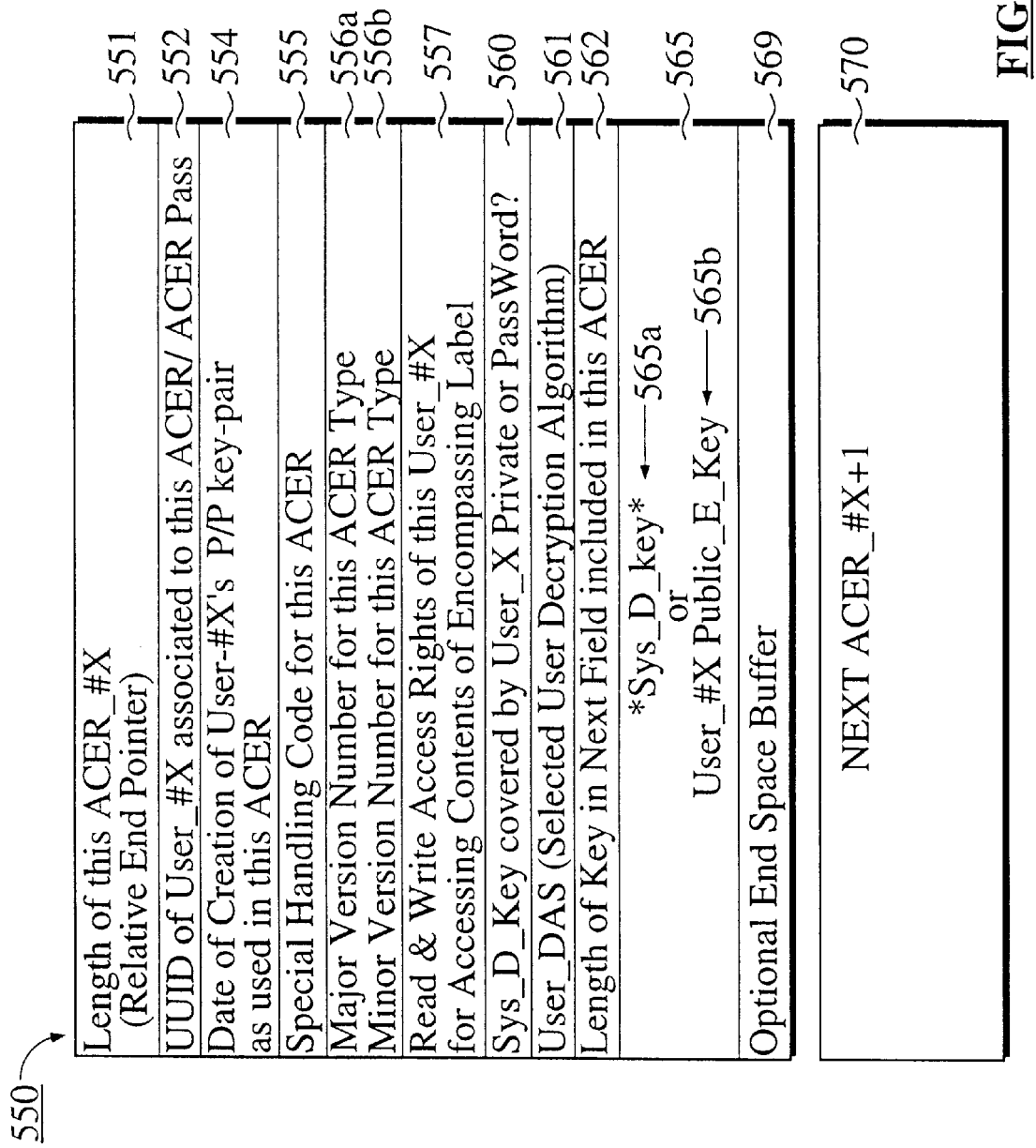
FIG. 5B shows a data structure for an Access Control-Entries Record (ACER).

The fields and/or blocks within stored file 502 are shown in FIGS. 5A–5B and are described as follows.

Length of this Label (Relative End Pointer)

This first field 511 in the data structure 500 of FIG. 5A contains a signal representing the total length of the present label portion 502b in terms of kilobytes, or of bytes or of bits, or of another appropriate measure. Field 511 can also be viewed as a relative address pointer to the end point 589 of the present label portion 502b. In one embodiment, field 511 defines label length in terms of kilobytes. The minimum increment of the label length in this embodiment is 1024 bytes. Each 1 kilobyte increment of label length accommodates an additional 3–4 new ACER's (approximately).

Length of Digital Signature

Second field 512 contains a signal representing the total length of a 'digital signature' that is stored in below-described field 540. The length (in terms of bytes or bits) of the digital signature 540 can vary with some algorithms. The data in field 512 indicates where the last valid bit of the digital signature is located.

If a first 'active' ACER 571 immediately follows the digital signature 540, then field 512 may also be viewed as a relative pointer to the start of the first active ACER 571.

Plaintext Banner

It is common practice to include a plaintext banner section such as 514 in a file label. The plaintext banner section 514 may be filled with any desirable data by the last modifier of the label portion 502b. Typically, the plaintext banner section 514 is used for distributing an ASCII-encoded message to other users such as, "This file encrypted with the XYZ security system. Use the UVW system to access it. For more information, connect through the network to the World Wide Web page located at: http:\\www.abc.com/help. Call me if you need to modify this file.—Shawn."

Label Presence Verifying Code

When a file is first opened, it is not always apparent whether a security label is or is not pre-fixed before the *FILE DATA* portion 502a of the opened file. Specially-located field 515 is provided for storing a code sequence that is relatively unique with respect to its sequence and its placement when compared to same-located data of non-secured files. This code is selected such that the probability that an ordinary file will randomly contain the same, label-presence verifying code in this same location 515 is relatively small (e.g., less than 1 out of a thousand or more). Field 515 is consulted as a sanity-check by label-using software (see step 625 of FIG. 6A) to better assure that a label is indeed present.

Major and Minor Version Numbers for this Label Type

The format of a file label 502b is subject to change over time as new fields are added or some are removed. It is common practice to supply a version number having a major portion and a minor portion as indicated by respective fields 516a and 516b. The major version number is incremented each time major revisions are made to the format of the file label 502b. The minor version portion 516b is incremented each time minor revisions are made to the format of the file label 502b. The label-using software (600 of FIGS. 6A–6B) should consult the major and minor version number fields 516a, 516b to determine what format is being used and it should then comply with that format.

System Decryption Algorithm Select code (SysDAS)

This field 517 contains the system decryption algorithm selecting code (SysDAS) which is defined as signal 318 in FIG. 3 and which is distributed to authorized users in plaintext form by way of path 318b in FIG. 3. The contents of this field 517 are retrieved from the label 502b by way of path 328b in FIG. 3 and then applied to input 327 of the D__unit 320.

If signal 318 is the same as signal 317 (FIG. 3), then this field 517 may also be viewed as containing the System Encryption Algorithm Select code (SysEAS). In one embodiment, a coding system such as the following is used: 0=No decryption needed, 1=Blowfish, 2=DES, 3=Triple DES, etc.

In alternate embodiment, this SysDAS field 517 is eliminated from the common portion 511–540 of the FILE LABEL 502b and is replaced with a privately-encrypted *SysDAS* entry (not shown) in each user's respective ACER, 571, 572, etc. This alternate approach corresponds to paths 318a and 328a of FIG. 3.

Length of System__D__key

The length of the system decryption key (Sys__D__key 316) can vary from one situation to another for numerous reasons. Performance speed requirements may take priority over security needs or vice versa. Government restrictions may limit the size of the Sys__D__key 316 to no more than a certain length (e.g., no more than 40 bits). Field 518 serves as a sanity-check for the label-using software. If D__unit 340 produces at its output 342, a system D__key signal 326 having a length greater than that specified by field 518, a variety of actions may be taken. In one embodiment, the excess bits of signal 326 are stripped off before application to input 325 of D__unit 320. In another embodiment, the file access attempt is refused. In third embodiment, a warning is issued and the excess bits of signal 326 are stripped off before application to input 325**.

File Compressor Identifier

The plaintext version (301) of the *FILE DATA* portion 502a may be pre-compressed with a commonly-available data-compression system prior to encryption by E__unit 310. Compression reduces file size and thereby reduces encryption/decryption time. It also allows a storage medium (e.g., a magnetic disk) of fixed size to store more files. The compressor identifier field 519 contains a compressor identifying code that indicates whether or not file compression has been conducted, and if so, by which compression system. The following coding system may be utilized: 0=No compression, 1=PK.ZIP™, 2=Other compressor system, etc.

Number of Activated ACER's in this Label

The number of users who are authorized to intelligibly access the *FILE DATA* portion 502a of each given file 500 can vary over time and even from one location to another. A given User__#J may be permitted to intelligibly access the *FILE DATA* portion 502a of a file stored in one on-network server but at the same time that same given User__#J may be denied permission to intelligibly access a replica *FILE DATA* portion 502a of a replica file that is stored in another location. The attached FILE LABEL portion 502b of each *FILE__N DATA* portion 502a defines the access rights for that *FILE__N DATA* portion 502a.

Aside from the right to intelligibly read the *FILE__N DATA* portion 502a, one or more users may be enabled, through further access rights provided in their respective ACER's (see field 557 of FIG. 5B), to modify the current label portion 502b and, in so doing to add active ACER's for newly-authorized users. The ACER of an already-authorized user is referred to here as an 'activated' ACER. As will be seen shortly, not-yet-authorized users who wish to have their respective ACER's inserted into the file label 502b as activated ACER's may request such action by writing an ACER Add-on Request block (e.g., 581) into a buffer zone 580 of the label. Each ACER Add-on Request block (e.g., 581) preferably has the same format as an activated ACER with the exception that field 565 (FIG. 5B) does not yet include a privately-encrypted copy *Sys_D_key* 565a of the Sys_D_key 316. The preferred format for and use of the ACER Add-on Request block (e.g., 581) is further described below.

Field 521 contains a signal representing the number of presently 'activated' ACER's in this label portion 502b. The activated ACER's are denoted as 571 through 579 in FIG. 5A. When a next-appended, ACER Add-on Request block (e.g., 581) is converted into an 'active' ACER, the number in this field 521 is incremented by one. Label-using software may use the contents of this field 521 to determine which ACER_#n 579 is the last 'active' ACER within the file label 502b.

Length of Activated ACER's in this Label

In one embodiment, each ACER includes a privately-encrypted (e.g., an RSA-encrypted) version, *Sys_D_key* of the system D_key. The length of the encrypted version *Sys_D_key* may vary from one instance to another and the length of each ACER may vary accordingly. Field 522 contains a signal that indicates the total length of the activated ACER's 571–579 in this label 502b. Field 522 can also be viewed as a relative address pointer to the starting point 580 of the label buffer zone 580–589.

OTF Recryption Flag

This field 524 contains an 'On-The-Fly' recryption algorithm flag. When the OTF recryption algorithm is used, as described in the above-referenced U.S. patent application Ser. No. 08/586,511 [Attorney Docket SYMA1015], field 524 is consulted by the OTF routines. One function of the OTF recryption flag 524 is to indicate whether or not the present file 500 is a 'special' file that should be excluded from automatic, on-the-fly decryption and re-encryption.

Initial Vector

For some decryption algorithms such as DES, the D_unit 320 needs to be supplied with an 'initial vector' or a 'seed' in addition to being supplied with the System_D_key 326. Field 530** stores an initial vector to be used with DES or another seed-primed decryption algorithm.

UUID of Last Modifier of this Label

This field 531 contains the UUID (or other User_ID) of the last user to modify the present label portion 502b. There are at least two uses for this label-contained identification 531 of the last label-modifier. First, it lets system administrators easily conduct automatic audits which determine who is responsible for the latest version of each file label 502b of each given file 500.

Second, the last label-modifier identification 531 may be used for automatically fetching the public D_key of that last label-modifier. The fetched public D_key is used for authenticating the integrity of the present label 502b based on the digital signature stored in field 540.

In one embodiment, the UUID of field 531 is submitted to the P/P key-pair distributor 390 of FIG. 3. In response, the P/P key-pair distributor 390 supplies the public key of the identified last-modifier. The released public key is used to decrypt the digital signature stored in field 540. The result is then compared against a hash of 'signature-covered' portions of the label 502b to assure that there have been no unauthorized changes made to the label.

Date of Last Modification of this Label

This field 532 stores the date of the last modification of the present label 502b.

Users may elect to change their public/private key pairs on random days for security reasons. In the process of authenticating the present label 502b with the digital signature stored in field 540, the date of last modification 532 should be supplied to the P/P key-pair distributor 390 together with the User_ID of field 531 so that the appropriate public key is released for authenticating the present label.

UUID of Initial Creator of this Label

Field 535 contains the UUID (or other User_ID) of the user who initially created the present label portion 502b. This information may be used for generating automatic audit trails. Usually, the initial creator of the label 502b will have his ACER in the first active ACER position 571. If needed, a system administrator may obtain a copy of the system D_key 316 from this first ACER_#1 571, by first fetching the UUID of field 535 (the User_ID of the initial creator) and the initial creation date stored in field 536. The system administrator may then obtain that user's private D_key from unit 390 and may apply it to uncover the *Sys_D_key* stored in field 565 (FIG. 5B).

The initial label-creator (535) is usually also the user who created the initial version of the *FILE DATA* portion 502a and perhaps the first few modified versions of that portion 502a. That user may have archived (and secured) copies of the initial *FILE DATA* portion 502a as it existed prior to subsequent modifications. In certain circumstances, it might be desirable to obtain that archived initial copy. For example, it might be desirable to determine what changes have been made. The UUID 535 of the initial creator may help in locating the initial copy and perhaps the first few modified versions of that portion 502a.

Date of Initial Creation of this Label

This field 536 contains the date of the initial creation of the present label portion 502b prior to all subsequent modifications. As indicated above, in certain circumstances it may be desirable to obtain the public or private keys of the initial creator and to apply them to an archived version of the present file. The date 536 of initial creation may be used to make sure that the correct version of that user's public/private keys are fetched from the key distributor 390.

Last Modification Date of Postfixed File

The post-fixed *FILE DATA* portion 502a may be modified independently of the label portion 502b. This field 539 indicates the last date of modification of the post-fixed *FILE DATA* portion 502a. It helps a group of authorized users to know what version of the file data they are working with.

Digital Signature by Last Modifier of this Label

The application of digital signatures for authenticating stored data is fairly well known.

In brief, a secured hash function is applied to the 'covered' portions of the signed-over data. The hash result is asymmetrically encrypted with a private key of an authenticating entity. Thereafter, the signed-over data is authenticated by reapplying the secure hash function to the 'covered' data portions. The digital signature is decrypted using the authenticating-entity's public key. The decryption result is compared against the hash result. If they match, a certain amount of confidence is created respecting the authenticity of the signed-over data. If they do not match, this indicates that the signed-over data has been tampered with and is thus no longer trustable.

In the case of secured file 500, the digital signature of field 540 'covers' the entire label portion 502b except for the signature itself 540 and the extension buffer zone that extends from point 580 through point 589. The authenticating entity who applies their signature over this covered data is the last label modifying entity identified by field 531. The private key of the so-identified last label-modifier (531) is used for genera ting the digital signature contained in field 540. The public key of this same last label-modifier (531) is used for authenticating the signed-over label 502b.

The label-using software preferably authenticates the 'covered' portions of the label 502b with the digital signature 540 to assure that the label had not been improperly tampered with before using that label.

Active ACER_#1 through ACER_#n

Blocks 571–579 respectively define the user records of an Access Control Table (ACT) that provides the functionalities generally described with respect to FIG. 4. In one embodiment, each ACER, 571, 572, . . . 579, is formatted in accordance with the structure 550 shown in FIG. 1B.

Extension Buffer space

The end of the last active ACER_#n 579 defines the beginning point 580 of the extension buffer space. This buffer space ends at location 589. The extension buffer space 580–589 is generally empty and may be used for adding new active ACER's to the label portion 502b without need for a rewrite of the *FILE DATA* portion 502a.

The extension buffer space 580–589 is not covered by the digital signature 540. As such, not-yet-authorized users may insert material into this buffer space 580–589 without interfering with the functionality of the remainder of the label 502b.

In one embodiment, the extension buffer space 580–589 is used by unauthorized users to submit ACER Add-on Requests such as shown at 581 and 582. Each ACER Add-on Request 581, 582, etc., preferably has the same structure as the model ACER 550 shown in FIG. 5B with the exception that region 565 stores the requesting user's public E_Key 565b instead of an encrypted *Sys_D_key* 565a.

The file label 502b may be periodically scanned by authorized users who have label-modification rights. One of these so-authorized users may scan the ACER Add-on Requests 581, 582, etc.; and if they so choose, such authorized users may modify the label 502b so as to convert one or more of the ACER Add-on Requests 581, 582, etc. into a respective one or more active ACER's. In this way, not-yet-authorized users who feel they should be granted access to the secured *FILE DATA* portion 502a may submit their requests by way of the file's label portion 502b. Multiple Add-on Requests can be centrally collected in the extension buffer space 580–589 and all acted upon at one time or on a request-by-request basis.

*FILE DATA* portion

As indicated above, the *FILE DATA* portion 502a begins at a point 590 that coincides with or follows the end 589 of the extension buffer space 580–589. The material between the beginning 590 and end 599 of the *FILE DATA* portion 502a is encrypted with the system E_Key 315, and as such it is depicted to have the following nonsensical form:

*&^%$#$%^&^%$#!##$%^&%%^(}>??<$$*
*&^%$#$%^&^%$#!##$%^&%%^(}>??<$$*

To gain intelligible access to the information contained between points 590–599, an authorized user locates his/her respective active ACER 571–579 within the access control table 571–579, fetches an included, but privately-locked *Sys_D_key* 565a, and decrypts this code 565a with his/her private key (394) or password in order to gain possession of the Sys_D_key** signal 326. Signal 326 is then used for decrypting the nonsensical data contained between points 590 and 599 of the *FILE DATA* portion 502a.

Referring to FIG. 5B, a preferred data structure 550 for both an active ACER (e.g., 571) and an ACER Add-on Request (e.g., 581) is now described.

Length of this ACER_#X

This first field 551 of the ACER data structure 550 contains a signal indicating the total length of the present ACER_#X (in terms of bits, bytes, or as otherwise appropriate). Field 551 may also be viewed as a relative address pointer to the end of the present ACER_#X and as a pointer to the beginning of the next ACER_#X+1 (570).

UUID of User_#X associated to this ACER or Other Access to This ACER

In one embodiment, the next field 552 contains the UUID or other identification of the User_#X that is associated with the current ACER_#X. The contents of this user-identifying field 552 are submitted to the P/P key-pair distributor 390 in order to fetch this user's private D_key 394.

In another embodiment, field 552 contains an ACER-access password code that, when given by any generic user (irrespective of that user's UUID), identifies the current ACER and grants that user access to this ACER and more specifically to the plaintext version of the *Sys_D_key* code 565a stored in below described field 565. The ACER-access password code is preferably at least as long as one of the earlier described UUID's. The special-handling code of field 555 may indicate whether present field 552 contains a UUID or other identification of the User_#X or whether present field 552 contains an ACER-access password code.

The ACER-access password code may be used in a following scenario: User_#A wants to transmit data securely over an open channel to User_#B. But User_#B does not have a UUID or other identification of who he/she is, installed on his/her computer. User_#A creates a generic ACER within the FILE LABEL portion 502b where field 552 contains a randomly-generated sequence defining the ACER-access password code. User_#A then sends the secured file (having the *FILE_N DATA* portion 502a and the just-modified FILE LABEL portion 502b) over the channel to User_#B. User_#A sends the ACER-access password code to User_#B over a separate channel (e.g., by telephone at a pre-arranged time). User_#B then supplies the received ACER-access password code to his/her computer and the label-using software locates the corresponding ACER and obtains the plaintext version of the *Sys_D_key* code 565a.

Referring to FIG. 3, for this User_#A/#B scenario, signal 364 is the ACER-access password code which User_#B supplies to his/her computer. Label-searching engine 365 scans the plurality of ACER's in the FILE_N LABEL portion 302b for an ACER having the matching ACER-access password code in its field 552. When found, the *Sys_D_key* signal in that matching ACER is passed through D_unit 340 to produce the System_D_key** 326. The User_#B key that is applied to key-input 345 of the D_unit 340 for this scenario can be any that is predefined by User_#A and relayed to User_#B over a relatively secure channel. The key that is applied to key-input 345 is really this ACER's private D_key rather than that belonging specifically to User_#B.

If desired, the special-handling code of field 555 may cause the generic ACER to be scorched out of the label 302b after the plaintext version 326 of the *Sys_D_key* code is released one-time from that generic ACER. The latter optional process thereby makes that generic ACER a one-time useable carrier of the *Sys_D_key* code.

Date of Creation of User_#X's P/P

As indicated earlier above, users may occasionally change their public-private key pair. The private key that was used to create the *Sys_D_key* code 565a has a certain date of creation associated with it. Field 554 stores an indicator that identifies the date of creation of User_#X's public/private key pair, as applied to code sequence 565a. If User_X has changed his/her P/P key-pair after the date of creation of this ACER_#X, the data in field 554 will indicate that a previous P/P key-pair needs to be used for uncovering (unlocking) the information within the *Sys_D_key* code sequence 565a.

Special Handling Code for this ACER

A variety of specialized, label-using software routines may be developed for reading the contents of a file label 502b and using it as appropriate. One example was already given above with respect to field 552. The present field 555 cooperates with the specialized, label-using software routines for providing specialized functions on a per-ACER basis.

By way of further example, specialized, label-using software may be provided for displaying various sections of a label 502b to an inquiring user by way of a screen or by other means (e.g., a printout). An inquiring user might wish to know, for example, who else is authorized to gain intelligible access to the attached *FILE DATA* portion 502a, and perhaps what are the access rights of each such user.

There may be instances where the system administrator wishes to hide from general viewing the identities of certain types of authorized users. The special handling code stored in field 555 cooperates with the label-using program to provide special handling functions for certain ACER's such as, but not limited to, not displaying the identity of the authorized user for whom this particular ACER has been created. Another special handling function might be, not displaying certain access rights of the user for whom this ACER has been created.

The usefulness of such special handling codes (555) may be understood by considering the following example. Assume a corporate entity hires three employees (Employees 1–3), assigns them to work on material contained within the secured *FILE DATA* portion 502a, but authorizes only Employee #2 to have label-modifying rights. Suppose a misunderstanding develops between Employee #2 and the corporate entity. Suppose Employee #2 decides to modify the label such that Employees #1 and #3 are locked out. Employee #2's intent in so doing is to hold as a hostage, the now non-accessible *File Data* portion 502a until the corporate entity complies with certain demands.

However, unbeknownst to Employee #2, there was another authorized user with file-access and label-modifying powers. The label-using software never displayed the presence of that other user because that other user's ACER had its special handling code of field 555 so encoded. In this example that non-displayed other user is the corporate entity. A special handling code was included in a fourth ACER to hide the existence of the fourth ACER from Employee #2. Now the corporate entity can instead lock-out Employee #2 by appropriately modifying the label, hand over secondary-modification rights to another employee, and thereby avoid being taken hostage through the security system applied to its own data.

The special handling code 555 may also be used to identify a special ACER by which government agencies or other specially-authorized entities may gain access to the secured *FILE DATA* portion 502a using a backdoor key.

Major & Minor Version Numbers for this ACER

As with the format of the enveloping label 502b, the format for an ACER of a given user may be modified in a major or minor way. Fields 556a and 556b respectively contain the major and minor version numbers of the current ACER and may be referenced by label-using software to determine what specific format is being used by each ACER. (A file label may contain ACER's having different formats.)

Read & Write Access Rights of this User_#X

Some users may be given full read and write access rights to all parts of the secured file 500 including the label portion 502b and the data portion 502a. Other users may be given read-only access rights with respect to the label portion 502b. The latter users are thus not able to modify the label portion 502b.

Field 557 contains code defining the various read and write access rights of this User_#X at least with respect to the label portion 502b, and optionally also with respect to the *DATA* portion 502a. (The latter access rights may be alternatively or additionally defined by the operating system's permissions flags.)

Sys_D_Key Covered by User_X Private or PassWord Key?

In one alternate embodiment of the present invention, units 330/340 (FIG. 3) define a symmetric encryption/decryption system instead of a non-symmetric one. In such a case, a same password-key is applied to key-inputs 335, 345 instead of the respective public and private keys. The applied password-key may be the same as the User #X_password 361 submitted to unit 360 or it may be different.

In yet another alternate embodiment of the invention, each of units 330 and 340 (FIG. 3) has an additional algorithm-selection input (shown as an unreferenced arrowhead) similar to the algorithm select-inputs 317, 327 of units 310 and 320. In this alternate embodiment, the E_/D_ units 330/340 are programmably configurable to operate either as a selected, symmetric encryption/decryption system or as a selected, non-symmetric (public/private) encryption/decryption system.

The private/password key-specifying field 560 indicates whether the *Sys_D_key* code sequence 565a is covered with the present User_X's private key or that user's password key. If field 560 indicates the use of a private key, then the user's private D_Key 294 is applied to input 345 of D_unit 340 and unit 340 is configured to function as part of a public/private key-pairing system. If field 560 indicates, on the other hand, that the user's password key had been used, that user's password key is applied to key-input 345 and D_unit 340 is configured to operate as part of a symmetric encryption/decryption system 330/340. Region 565 can therefore be used to distribute the Sys_D_key** signal 326 to one or both types of users, namely, those that have public/private key-pairs and those that do not. The latter users would instead use their individual password keys to uncover the *Sys_D_key*.

User_DAS (Selected Private Decryption Algorithm)

In one embodiment, field 561 stores a User_DAS signal (shown in FIG. 3 as an unreferenced arrowhead and analogous to 327). When fetched, the signal in field 561 is applied to an algorithm-select input (unreferenced) of D_unit 340. The following coding system may be used: 0=No decryption, 1=RSA public/private, 2=DES (symmetric), 3=Blowfish, etc. When units 330/340 define a symmetric encryption/decryption system, the User_DAS signal may be the same as the corresponding User_EAS signal that would be applied to an algorithm-select input (shown in FIG. 3 as an unreferenced arrowhead and analogous to 317) of E_unit 330. Field 561 of this embodiment therefor defines what decryption algorithm is to be applied to a below-described, code-containing field 565a.

In another embodiment, the decryption algorithm of D_unit 340 is otherwise established and field 561 stores the *SysDAS* signal 318a (FIG. 3). When fetched, the signal in field 561 is first uncovered by the user's private D_key (or by his/her private password) and thereafter applied by path 328a to input 327 of D_unit 320.

Length of Key-containing Code in Next Field included in this ACER

Field 562 contains a signal indicating the length (in bits or bytes) of the key-containing code found in the next field 565. This length-specifier 562 assists the label-using software in determining the length of valid key-containing code in next field 565.

*Sys_D_Key* or User_#X Public Key

Field 565 may contain two different kinds of key-containing code. In one instance, field 565 holds the *Sys_D_key* code 565a and the present ACER_#X is an active ACER.

In an alternate instance, field 565 holds code 565b where the latter is the public E_Key of a request-submitting User_#X. In this alternate instance, structure 550 may function as an ACER Add-on Request such as shown at 581, 582 (FIG. 5A). If and when the add-on request is granted, the user's public E_Key 565b is fetched from field 565 and submitted to key-input 335 of E_unit 330. The Sys_D_key signal 316 (or signal 326) is applied to input 331. The result 332 is then overwritten into field 565. Appropriate modifications are made to fields 521, 522, 531, 532 and 540 of the label 502b, and the add-on request is thus transformed into an active ACER.

If the extension buffer space 580–589 approaches an overflow condition, the length of the label portion 502b may be increased by modifying field 511. The *FILE DATA* portion 502a will generally have to be rewritten in such a case to make room for the lengthened label portion 502b.

Optional End Space Buffer

Like the enveloping label 502b, each ACER 550 may optionally include an end space buffer region 569 for accommodating internal growth of the ACER data structure 550. When the optional end space buffer 569 is included, the internal structure of a given ACER 550 may be modified to add new fields without having to rewrite the ACER's of other users.

NEXT ACER_#X+1

As shown, the next ACER_#X+1 follows the end of ACER_#X. Given the use of version numbers and the optional end space buffer 569, the next ACER_#X+1 (570) may be identical to or different in format from the preceding ACER_#X (550).

Figure 6A:
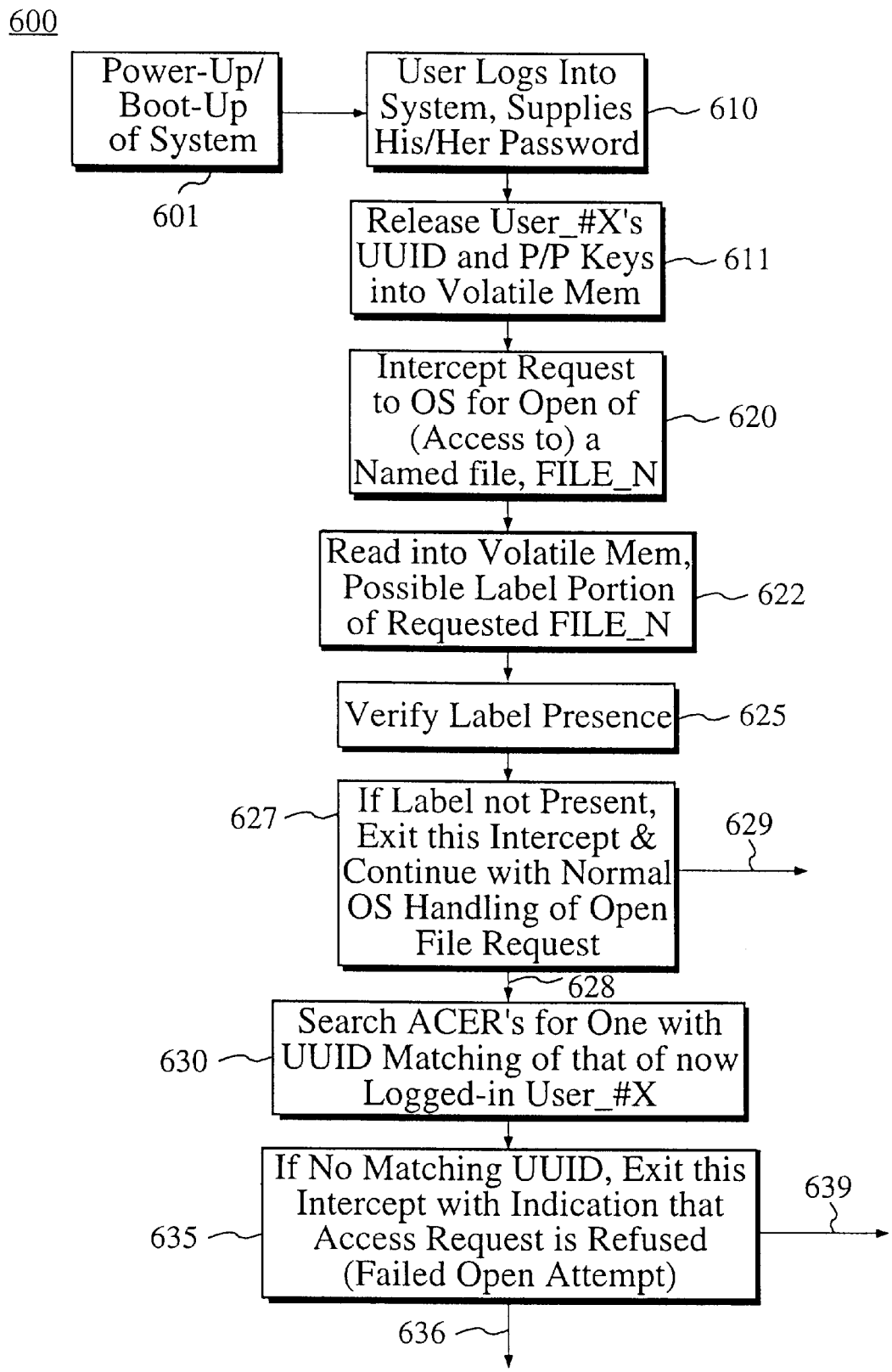
FIG. 6 is a flow chart of a file access procedure in accordance with the invention.
Figure 6B:
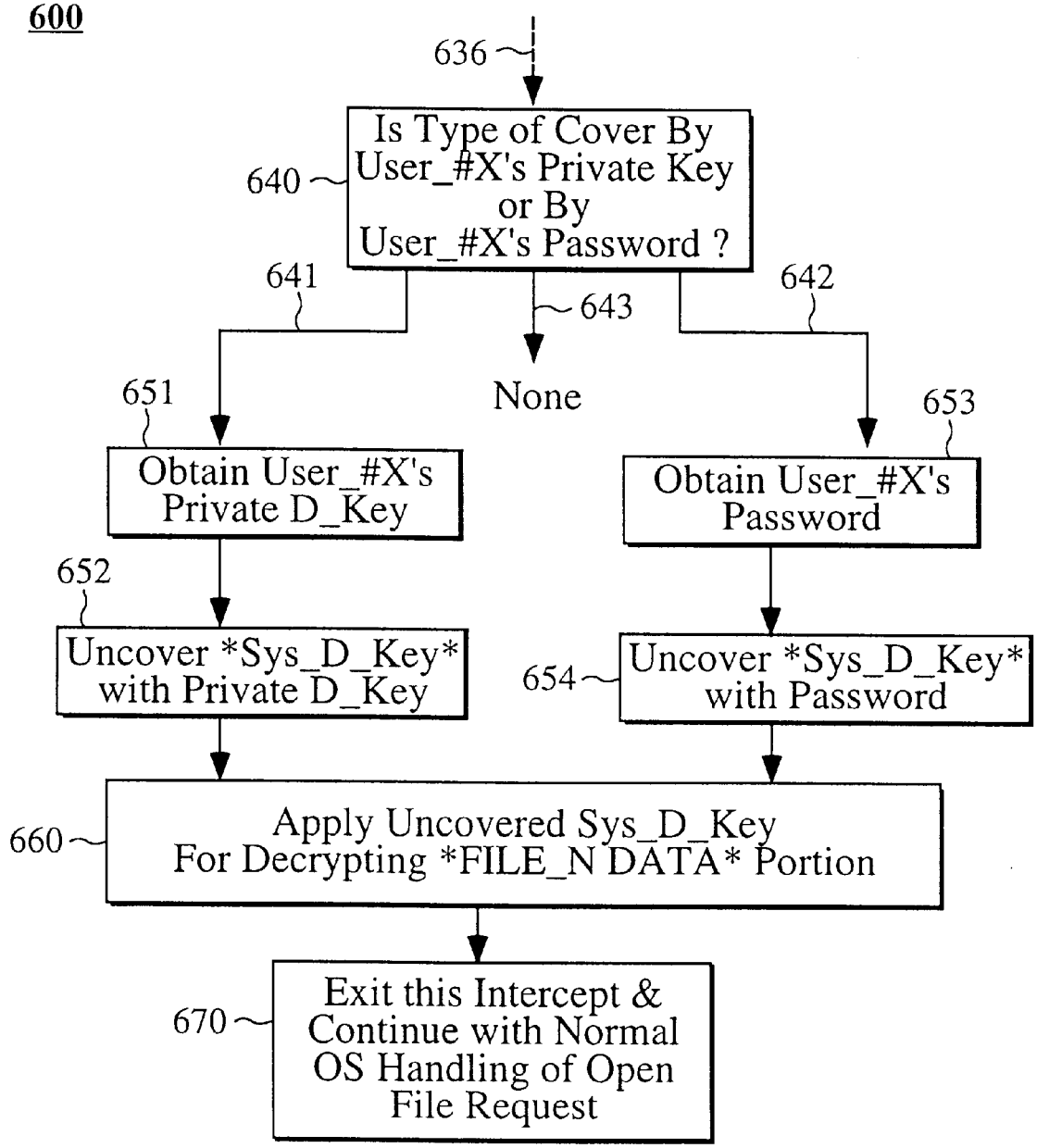

Referring to FIGS. 6A–6B, a label-using process 600 in accordance with the invention is now described.

At step 601, the computer system is powered-up or rebooted. At step 610, a given User_#X logs into the system and supplies his/her password. This User_#X's password 361 is applied to the identification authenticator 360 of FIG. 3. Upon entry of an acceptable password and performance of optional, other identification authenticating tasks, unit 360 releases plaintext versions of the user's private D_Key 394 and UUID 393 into the volatile memory (e.g., RAM) of the system. This release is indicated by step 611.

At step 620, User_#X, or an application program that the user is running, submits a file-access request to the computer's operating system (OS). Typically, this is in the form of an OPEN FILE request followed by the name of the file to be opened. The label-using program intercepts this request to the OS and redirects control to next step 622.

At step 622 the starting portion of the requested file is read from disk (or another appropriate media) and stored into the system volatile memory (RAM). The just-read portion may or may not contain a file security label such as 502b of FIG. 5A.

At step 625, a test is performed to determine if a label is present. In one embodiment, the location corresponding to field 515 is scanned for label-presence verifying code. Lack of such a code indicates that a label is not present.

At decision step 627, the OS intercepting routine is exited if it is determined that a label is not present. The exit path 629 continues with a normal OS handling of the OPEN FILE request. It is assumed that the requested file is not secured because it does not have a label, and as such, the file's contents can be intelligibly accessed without decryption.

If a label has been detected, step 627 passes control by way of path 628 to step 630.

In step 630, the Access Control Table (ACT) is scanned for an ACER containing a user identification matching that of the presently logged-in User_#X.

At decision step 635, if no matching user identification had been found within the Access Control Table (ACT), it is decided that this user is not authorized to access the requested file. The intercept routine is exited by way of path 639 and the routine passes a 'failed' OPEN attempt indicator to the operating system. The operating system then handles the failed OPEN as appropriate.

If within decision step 635 it is determined that a matching user identification (e.g., a matching UUID) had been found, then the intercept routine continues along path 636 to step 640 (FIG. 6B).

At step 640, a field such as 560 (FIG. 5B) of the ACER is consulted to determine whether the key-containing code 565a is covered with the user's private key or with the user's password. If the answer is neither, path 643 is taken back to step 635 (FIG. 6A) and the intercept routine is exited with a failed-OPEN indication by way of path 639.

Path 641 is followed if step 640 determines that an asymmetric private key has been used as the private user key. Path 642 is followed if step 640 determines that a symmetric password has been used as the private user key. In step 651 the user's private D-key is obtained from the P/P key-pair distributor 390 by submitting the user's UUID to unit 390. Alternatively, for path 642, the user's password key is obtained in step 653.

In step 652, the key-containing code *Sys_D_key* 565a is asymmetrically uncovered using the user's private D-key. Alternatively, if path 642 had been taken, the key-containing code 565a is symmetrically uncovered with the user's password key in step 654.

At subsequent step 660, the uncovered Sys_D_key** is applied to input 325 of D_unit 320 for decrypting the *FILE DATA* portion 502a of the requested file.

Following successful decryption, step 670 returns control to the operating system for normal handling of the remainder of the OPEN FILE request. In one embodiment, the label-using program 600 forms a complementary part of the SYSTEM FOR AUTOMATIC DECRYPTION OF FILE DATA ON A PER-USE BASIS as disclosed in the above-referenced U.S. application Ser. No. 08/586,511.

The above-described methods and physical implementations of data structures may be practiced in a variety of settings.

Figure 7:
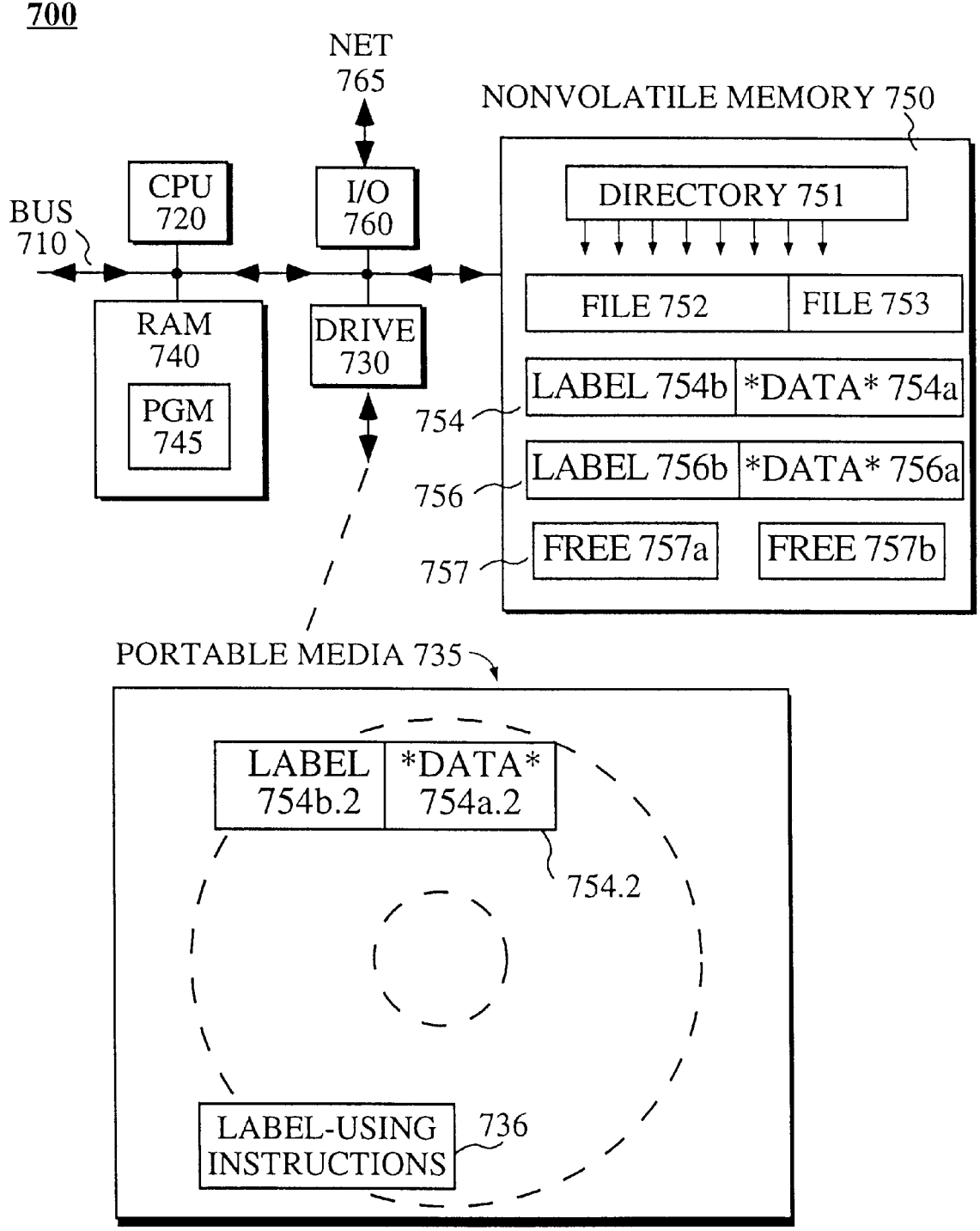
FIG. 7 is a block diagram of a computer system in accordance with the invention.

FIG. 7 is a block diagram of a computer system 700 that may be used in accordance with the invention. Computer system 700 includes a system bus 710 coupling a system memory 740 such as a random access memory (RAM) to a plurality of other system resources including a system CPU 720, system I/O 760, an intersystem data conveyance means 730 (e.g., diskette or CD drive), and a nonvolatile disk subsystem 750. Portable media 735 (e.g., a floppy diskette or a CD-ROM disk) is removably and operatively couplable with system 700 by way of the intersystem data conveyance means 730.

The system memory 740 may comprise assorted types of high-speed random access devices into which immediately executable code may be stored. System memory 740 can include one or more of static RAM (SRAM), dynamic RAM (DRAM), and other like devices. Typically at least part of the system memory 740 is volatile, meaning data is lost and must be rewritten when power is lost. It is not outside the contemplation of the invention to have system memory 740 defined partly by non-volatile random access memory devices such as flash EEPROM. Often the computer system 700 will include a small boot ROM (Read Only Memory, not shown) coupled to the CPU 720 for power-up and other basic re-bootings of the system.

Plaintext versions of confidential information such as that of FILE_N DATA 303 (FIG. 3), System_D_key 326 and private D_key 394 are preferably placed only in the volatile portions of system memory 740 for short-term use as needed, and thereafter immediately scorched (erased to an extent that removes the possibility of simple recovery).

When system 700 boots-up, various files are automatically loaded from the disk subsystem 750 or from elsewhere (e.g., from system I/O 760) into system memory 740 to thereby create a collection of data structures within system memory 740. These data structures normally include executable instruction code (e.g., 745) that can be immediately and usefully executed by a responsive data processing unit such as the illustrated central processing unit (CPU) 720 of FIG. 7 or by non-centralized multiple data processing units (not shown) that may be further or alternatively coupled to bus 710.

The system I/O module 760 uses bus 710 for transferring data between one or more of the illustrated portions of system 700 and external devices. In one embodiment, the system I/O module 760 may couple the illustrated system bus 710 to a variety of external resources such as a user terminal (e.g., keyboard and monitor), a local area network (LAN), a wide area network (WAN) and/or to other external data transceiving and processing means 765.

The data conveyance means 730 can be defined by data transfer devices such as floppy diskette drives, tape drives, CD-ROM drives and other such means by which data recorded on transportable media 735 can be brought into system 700 or copied and carried away from system 700.

The disk subsystem 750 typically includes a drive (not separately shown) and a nonvolatile data storage medium (not separately shown) onto which data may be stored and from which data may be retrieved. The disk data storage medium may be in the form of a magnetic hard disk, or a floppy diskette, or a re-writable optical disk, or other such non-volatile, randomly accessible, re-writable media. ROM or Flash EEPROM may be alternatively used in carrying out some or all of the nonvolatile data storing functions of the disk subsystem 750.

Data is recorded on the disk subsystem 750 to define a directory structure 751 and a plurality of files (not all shown) such as automatic boot-control files 752, and other nonsecured files such as 753.

Directory structure 751 points to, and defines the storage organization of each of the stored files. By way of example, the boot-control files 752 may be defined as being contained in a root directory (such as c:\in MS-DOS™ parlance). The unsecured other files 753 may be defined as being contained in a first subdirectory (such as c:\u in MS-DOS™ parlance). Yet other files such as the illustrated files 745 and 756 may be defined as being contained in a second subdirectory 760 (such as c:\s in MS-DOS™ parlance). One or more of the files such as 754 and 756 are referred to herein as secured or encrypted files. Secured files 754–756 are preferably defined in accordance with the file data structure 500 of FIGS. 5A–5B.

Directory structure 751 may further store various levels of OS-defined permission flags with respect to each file. These OS-defined permission flags are independent of the access right signals contained in area 557 of FIG. 5B. Although not shown, the disk subsystem 750 may temporarily contain plaintext file copies derived from one or more of its encrypted files, 754–756 by way of decryption.

Although not further explicitly shown in FIG.7, disk subsystem 750 may further store: (a) software instructions for causing CPU 720 to carry out all or at least part of the machine-implemented, data processing functions described with respect to FIGS. 3 through 6B, and (b) secured versions of various keys such as the *Sys_D_key*.

All or various parts of the data recorded on the disk subsystem 750 may be brought into subsystem 750 or copied out from subsystem 750 through a variety of means including data conveying means 730 and/or I/O means 760. The latter collection of pathways may include but are not limited to: floppy diskettes, compact-disks (CD-ROM), tape, and over-a-network downloading by a file server computer or the like.

Given that data in stored files such as encrypted files, 754–756 may become available to unauthorized users through a variety of ways (as already described above), it is desirable to keep as much of this stored data in an encrypted form (ciphertext form) except for times when it is being legitimately used by authorized users. The legitimate plaintext versions are temporarily kept in system memory 740 as explained above and scorched as soon as their continued existence no longer serves the needs of an authorized user.

It is desirable, on the other hand, to make the encrypted *DATA* portions (754a, 756a) of secured files (754, 756) intelligibly accessible to authorized users, wherever they are located, in as easy a manner as possible without compromising security.

By way of example, suppose system 700 is an in-office machine and an authorized User_#X wishes to take a current copy 754.2 of secured file 754 home to work with on his/her home computer. Although not shown, the home computer can have the same basic structure 700 as that of the in-office computer with the exception that a current copy of file 754 does not resides within the home computer. The home computer (not shown) is occasionally referenced herein as 700'.

The copy 754.2 can be made by passing signals representing file 754 from disk subsystem 750, over system bus 710 and through data conveyance means 730 onto the transportable (nonvolatile) media 735. The copied encrypted *DATA* portion 754a.2 is equivalent to the original encrypted *DATA* portion 754a. The copied LABEL portion 754b.2 is equivalent to the original LABEL portion 754b. In addition to the copied file 754.2, User_#X may also record onto transportable media 735, label-using software instructions that are targeted for his/her home computer for causing that home computer 700' to function in accordance with the systems of FIGS. 3–6B. Such label-using software instructions are represented by the on-media data 736 of FIG. 7.

If for some reason User_#X loses possession of transportable media 735, the *DATA* portion 754a.2 recorded thereon continues to remain secure by virtue of it being still encrypted and because the LABEL portion 754b.2 does not contain a plaintext version of the Sys_D_Key signal (316) that is needed for unlocking *DATA* portion 754a.2.

Once at home, authorized User_#X can unlock *DATA* portion 754a.2 by supplying his/her private D_key (or password key) to uncover the *Sys_D_key* signal stored in his/her respective ACER within LABEL portion 754b.2.

If our exemplary User_#X has file-modifying rights, that User_#X may modify the plaintext information of *DATA* portion 754a.2 on his/her home computer, re-encrypt it with the System_E_key (315) and overwrite area 754a.2 of the transportable media 735 with the new version.

If our exemplary User_#X has label-modifying rights, that User_#X may choose to scan the extension buffer space 580–589 (FIG. 5A) while working on his/her home computer 700', and to grant intelligible access rights to not-yet-authorized users who have appended their ACER Add-on Request blocks (e.g., 581) into buffer space 580–589 over a recent time period. The intelligible access rights are granted by transforming the ACER Add-on Request blocks (e.g., 581) into active ACER's as explained above. When done, our exemplary User_#X overwrites area 754b.2 of the transportable media 735 with the new version of the label.

On return to the office, our exemplary User_#X inserts the at-home modified transportable media 735 into drive 730 and overwrites the old version of file 754 with the new version 754.2 now stored on media 735.

A next, authorized user (User_#X+1) can now intelligibly access the encrypted *DATA* portion 754a (or modified 754a.2) and perform further work on that portion 754a (or on the on-diskette, modified portion 754a.2) as desired.

If an old private D_key or private password of a given User_#X+2 is deemed to be compromised for some reason, his/her respective ACER (e.g., 572) should be scorched out of the LABEL portion 754b on the office machine and also out of the corresponding label portions of all off-site copies (e.g., 754.2) of the file. A new ACER that is secured by a new private D_key or a new private password can then be created for this User_#X+2. All other users can continue to transparently use their old private D_keys or private passwords without concern for the compromised condition of User_#X+2's old private D_key or private password.

This is in sharp contrast to what would have happened if the multi-user shared-key system 100' of FIG. 1B had been used. There, in FIG. 1B, if a key-compromising incident occurs to one user, all users must be given a new multi-user shared-key. This inconveniences all the users. The process of mass-distributing the new key itself creates a new possibility of compromise.

Although the above discussion in relation to transportable media 735 described the conveyance of a file copy 754.2 from one computer 700 to a home computer 700' (not shown) by way of the so-called sneaker-ware path (by using transportable media 735 to convey the file between the two machines), a similar process can be carried out through signal transmission by way of network connection 765 between the two machines 700 and 700' (the latter not shown). The signal transmission path 765 does not have to be a secured channel because the transmitted *DATA* portion 754a.2 is protected by encryption. The transmitted *Sys_D_key* is also protected by private encryption within the respective ACER of each authorized user.

As such, a convenient and secure system has been described for allowing multiple users to share access to a given file and for easily managing the distribution of access keys to various users.

Given the above disclosure of general concepts and specific embodiments, the scope of protection sought is to be defined by the claims appended hereto.

What is claimed is:

1. A machine system for maintaining confidential information generally in encrypted form while allowing for intelligible access to such confidential information by multiple users, said machine system comprising:
    (a) a first data conveyance means for conveying digitized first data representing said encrypted form of the confidential information and for further conveying digitized second data representing an associated label,
        (a.1) wherein said encrypted form of the confidential information is producible by a first encrypting process using a first encryption key,
        (a.2) wherein said second data contains two or more encrypted versions of a first decryption key, said first decryption key being a signal that is applicable to a first decrypting process for decrypting the encrypted form of the confidential information and for thereby producing a plaintext form of the confidential information,
            (a.2a) wherein a first of said two or more encrypted versions of the first decryption key is decipherable by a first user key, the first user key being associated with a first user among said multiple users;
            (a.2b) wherein a second of said two or more encrypted versions of the first decryption key is decipherable by a second user key, the second user key being associated with a second user among said multiple users;
    (b) a first decrypting mechanism, operatively coupled to the first data conveyance means, for receiving the first data and for, upon a supplying of said first decryption key to said first decrypting mechanism, decrypting the first data into digitized third data representing the plaintext form of the confidential information; and
    (c) a second decrypting mechanism, operatively coupled to the first data conveyance means, for receiving at least one portion of said second data and for, upon a supplying of a corresponding one of said first and second user keys to the second decrypting mechanism, decrypting the at least one portion of said second data into digitized fourth data in accordance with a second decryption process so that said fourth data includes the first decryption key,
        (c.1) wherein the second decrypting mechanism is operatively coupled to supply the first decryption key to the first decrypting mechanism;
        (c.2) wherein said second decrypting mechanism defines part of an asymmetric encryption/decryption system;
            (a.2c) wherein said first user key defines a private part of a first public-private key pair associated with said first user; and
            (a.2d) wherein said second user key defines a private part of a second public-private key pair associated with said second user.

2. A machine system according to claim 1 wherein:
    (a.3) said first data conveyance means includes digital data storing means for storing said digitized first and second data.

3. A machine system according to claim 2 wherein:
(a.4) said first data conveyance means further includes digital data transmitting means for transmitting said first and second data by way of a nonsecure data transmission path.

4. A machine system according to claim 2 wherein:
(a.3b) said second data contains a plurality of Access-Control-Entries Records (ACER's),
(a.3bi) a first of the plural ACER's includes said first encrypted version of the first decryption key;
(a.3bii) a second of the plural ACER's includes said second encrypted version of the first decryption key;
(a.3biii) the first ACER further includes a first user associating signal for associating the first ACER with said first user;
(a.3biv) the second ACER includes a second user associating signal for associating the second ACER with said second user.

5. A machine system according to claim 4 further comprising:
(d) search means for scanning the plural ACER's within the second data, for locating therein a user-associated ACER that includes the user associating signal of an otherwise identified user, and for causing the corresponding encrypted version of the first decryption key to be supplied from the user-associated ACER to be supplied to said second decrypting mechanism.

6. A machine system according to claim 5 further comprising:
(e) identity authenticating means, operatively coupled to the search means, for authenticating the identity of an access-requesting user and for, upon successful authentication of the identity of the access-requesting user, supplying a corresponding user identification signal to the search means to thereby otherwise identify the access-requesting user.

7. A machine system according to claim 6 further comprising:
(f) a user-key distributing means, responsive to the identity authenticating means, for supplying the associated user key of the otherwise identified access-requesting user to the second decrypting mechanism upon successful authentication of the identity of the access-requesting user by the identity authenticating means.

8. A machine system according to claim 7 further comprising:
(g) a first encrypting mechanism, operatively coupled to the first data conveyance means, for receiving supplied data signals representing the confidential information and for, upon a supplying of a first encryption key to said first encrypting mechanism, encrypting the supplied data signals to thereby produce said first data and for further supplying said first data to the first data conveyance means; and
(h) a second encrypting mechanism, operatively coupled to the first data conveyance means, for receiving at least one portion of confidential data to be conveyed by the first data conveyance means and for, upon a supplying of a user encryption key to the second encrypting mechanism, encrypting the at least one portion of said to-be-conveyed confidential data to thereby produce a secured portion of the second data so that said secured portion includes an encrypted version of the first decryption key,
(h.1) wherein the second encrypting mechanism is operatively coupled to receive the user encryption key of the access-requesting user from the user-key distributing means after successful authentication of the identity of the access-requesting user by the identity authenticating means.

9. A machine system according to claim 8 wherein said first encrypting mechanism carries out a selectable one of a plurality of encrypting processes and responds to a supplied encryption algorithm select signal by carrying out a selected one of said plurality of encrypting algorithms as indicated by the encryption algorithm selecting signal.

10. A machine system according to claim 9 wherein the selectable encrypting processes include two or more members of the group consisting of:
(1) XORring with a supplied keystream;
(2) X_NORing with a supplied keystream;
(3) performing according to the Data Encryption Standard (DES);
(4) performing triple-DES;
(5) performing RSA RC4™;
(6) performing RSA RC5™; and
(7) carrying out the Blowfish algorithm.

11. The machine system of claim 6 wherein said user identifying signal is at least 40 bits long.

12. A machine system according to claim 1 wherein:
(a.3) the combination of said first encrypting process and said first decrypting mechanism defines a symmetric encryption/decryption system and said first decryption key is the same as said first encryption key.

13. A machine system according to claim 12 wherein:
(c.2a) said second decrypting mechanism operates in accordance with the RSA public/private algorithm.

14. A machine system according to claim 1 wherein:
(a.3) said second data contains a plurality of Access-Control-Entries Records (ACER's) and each respective ACER includes:
(a.3a) a first entry containing a respective, encrypted version of the first decryption key, and
(a.3b) a second entry containing non-encrypted other data.

15. A machine system according to claim 14 wherein said non-encrypted other data includes:
(a.3bi) an identification of a decryption algorithm that may be used to decrypt the first data with a plaintext version of the first decryption key as derived from the respective ACER-contained, encrypted version of said first decryption key.

16. A machine system according to claim 14 wherein said on-encrypted other data includes:
(a.3bi) a unique identification of the respective ACER for distinguishing the respective ACER from other ACER's within said second data.

17. A machine system according to claim 16 wherein said unique identification of at least one ACER includes a Unique User Identification signal (UUID) for associating the at least one ACER with a respective one of said multiple users.

18. A machine system according to claim 14 wherein said non-encrypted other data includes at least two members of the following group:
(a.3bi) a unique identification of the respective ACER for distinguishing the respective ACER from other ACER's within said second data;
(a.3bii) an identification of a decryption algorithm that may be used to decrypt the first data with a plaintext version of the first decryption key as derived from the respective ACER-contained, encrypted version of said first decryption key;

(a.3biii) an identification of the first encrypting process that was used to produce said first data;

(a.3biv) a special processing code for specifying special processing for the respective ACER;

(a.3bv) a record format code for specifying a respective data format for additional data contained in the respective ACER; and (a.3bvi) a group identifying code for specifying a group of ACER's or a group of users to which the respective ACER or respectively-associated user belongs.

19. A machine system according to claim 14 wherein said non-encrypted other data includes at least five members of the following group:

(a.3bi) a unique identification of the respective ACER for distinguishing the respective ACER from other ACER's within said second data;

(a.3bii) an identification of a decryption algorithm that may be used to decrypt the first data with a plaintext version of the first decryption key as derived from the respective ACER-contained, encrypted version of said first decryption key;

(a.3biii) an identification of the first encrypting process that was used to produce said first data;

(a.3biv) a special processing code for specifying special processing for the respective ACER;

(a.3bv) a record format code for specifying a respective data format for additional data contained in the respective ACER; and (a.3bvi) a group identifying code for specifying a group of ACER's or a group of users to which the respective ACER or respectively-associated user belongs.

20. A machine system according to claim 1 wherein:

(a.3) said second data contains a plurality of Access-Control-Entries Records (ACER's) and each respective ACER includes:

(a.3a) a first entry containing a respective, encrypted version of the first decryption key, and (a.3b) a second entry containing encrypted other data.

21. A machine system according to claim 20 wherein said encrypted other data includes at least one member of the following group:

(a.3bi) a unique identification of a user associated with the respective ACER, said identification distinguishing the respective user from others of said multiple users;

(a.3bii) an identification of a decryption algorithm that may be used to decrypt the first data with a plaintext version of the first decryption key as derived from the respective ACER-contained, encrypted version of said first decryption key;

(a.3biii) an identification of the first encrypting process that was used to produce said first data;

(a.3biv) a respective, encrypted version of the first encryption key; and (a.3bv) a respective, encrypted version of another encryption or decryption key that is distributable by way of the respective ACER.

22. A machine system according to claim 20 wherein said encrypted other data includes at least four members of the following group:

(a.3bi) a unique identification of a user associated with the respective ACER, said identification distinguishing the respective user from others of said multiple users;

(a.3bii) an identification of a decryption algorithm that may be used to decrypt the first data with a plaintext version of the first decryption key as derived from the respective ACER-contained, encrypted version of said first decryption key;

(a.3biii) an identification of the first encrypting process that was used to produce said first data;

(a.3biv) a respective, encrypted version of the first encryption key; and (a.3bv) a respective, encrypted version of another encryption or decryption key that is distributable by way of the respective ACER.

23. A machine system according to claim 1 further comprising:

(d) second data conveyance means which is operatively coupled to the first data conveyance means for conveying replicas of said first data and said second data to and/or away from the first data conveyance means.

24. A machine system according to claim 23 wherein said second data conveyance means includes at least one member of the group consisting of:

(d.1) transportable media;

(d.2) drive means for reading data from or writing data to transportable media; and (d.3) I/O means for communicating with other machine systems.

25. The machine system of claim 1 wherein said first decryption key is at least 40 bits long.

26. A machine-implemented method for distributing confidential information in encrypted form to multiple users, said method comprising the steps of:

(a) conveying to at least one user machine, first data representing said encrypted form of the confidential information, where said encrypted form of the confidential information is producible by a first encrypting process using a first encryption key;

(b) conveying to said at least one user machine, second data representing an associated label of the first data; and (c) including within said second data two or more Access-Control-Entries Records (ACER's) each containing a respective, encrypted version of a first decryption key, said first decryption key being a signal that is applicable to a first decrypting process for decrypting the encrypted form of the confidential information and for thereby producing a plaintext form of the confidential information, (c.1) wherein a first of said encrypted versions of the first decryption key, which is contained in a respective first of said ACER's, is decipherable by a first ACER key, the first ACER key being associated with said first ACER, and (c.2) wherein a second of said encrypted versions of the first decryption key, which is contained in a respective second of said ACER's, is decipherable by a second ACER key, the second ACER key being associated with the second ACER, and the second ACER key being different from the first ACER key.

27. A machine-implemented method according to claim 26 further comprising the step of:

(d) decrypting one of said ACER-contained encrypted versions of the first decryption key by using the corresponding ACER key to thereby produce a plaintext version of the first decryption key.

28. A machine-implemented method according to claim 27 further comprising the step of:

(e) decrypting said first data by using said plaintext version of the first decryption key.

29. A machine-implemented method according to claim 28 further comprising the steps of:
- (f) associating each of said multiple users with a respective one of said ACER's; and
- (g) upon receipt of a file access request associated with one of said multiple users, locating the associated ACER and using the encrypted version of the first decryption key contained within the located ACER to produce said plaintext version of the first decryption key.

30. A machine-implemented method according to claim 26 wherein:
- (c.1a) the first ACER key is a first private decryption key belonging to a first public/private key pair of a first of said users; and
- (c.2a) the second ACER key is a second private decryption key belonging to a second public/private key pair of a second of said users.

31. A machine-usable memory storing a multi-user data structure comprising:
- (a) a secured file data portion (*FILE DATA* portion) that is encrypted by a first encrypting process using a first encryption key; and
- (b) a file label portion associated with the secured file data portion, said file label portion including:
  - (b.1) a plurality of Access-Control-Entries Records (ACER's) each containing a respective, encrypted version of a first decryption key, said first decryption key being a signal that is applicable to a first decrypting process for decrypting said *FILE DATA* portion, wherein each ACER-contained encrypted version is decipherable by an ACER-specific key.

32. A machine-usable memory according to claim 31 wherein each ACER further includes non-encrypted other data and the non-encrypted other data contains at least one member of the following group:
- (b.1i) a unique identification of the respective ACER for distinguishing the respective ACER from other ACER's within said file label;
- (b.1ii) an identification of a decryption algorithm that may be used to decrypt the encrypted *DATA* portion with a plaintext version of the first decryption key as derived from the respective ACER-contained, encrypted version of said first decryption key;
- (b.1iii) an identification of the first encrypting process that was used to produce said encrypted *DATA* portion;
- (b.1iv) a special processing code for specifying special processing for the respective ACER;
- (b.1v) a record format code for specifying a respective data format for additional data contained in the respective ACER; and
- (b.1vi) a group identifying code for specifying a group of ACER's or a group of users to which the respective ACER or respectively-associated user belongs.

33. A machine-usable memory according to claim 31 wherein the file label portion further includes:
- (b.2) a digital signature covering part of the file label portion; and
- (b.3) an extension buffer space not covered by said digital signature.

34. A machine-usable memory according to claim 31 wherein the file label portion further includes:
- (b.2) a number-of-ACER's signal representing the number of activated ACER's present in the label portion; and
- (b.3) a length-of-ACER's signal indicating the total extent of activated ACER's present in the label portion.

35. A machine-usable memory according to claim 31 wherein the file label portion further includes:
- (b.2) a length-of-label signal representing the total length of the label.

36. A machine-usable memory according to claim 31 wherein the file label portion further includes:
- (b.2) a plaintext banner that directs inquirers to a network-accessible file for further information respecting the attached *FILE DATA*.

37. A machine-usable memory according to claim 31 wherein each ACER further includes non-encrypted other data and the non-encrypted other data contains at least four members of the following group:
- (b.1i) a unique identification of the respective ACER for distinguishing the respective ACER from other ACER's within said file label;
- (b.1ii) an identification of a decryption algorithm that may be used to decrypt the encrypted *DATA* portion with a plaintext version of the first decryption key as derived from the respective ACER-contained, encrypted version of said first decryption key;
- (b.1iii) an identification of the first encrypting process that was used to produce said encrypted *DATA* portion;
- (b.1iv) a special processing code for specifying special processing for the respective ACER;
- (b.1v) a record format code for specifying a respective data format for additional data contained in the respective ACER; and
- (b.1vi) a group identifying code for specifying a group of ACER's or a group of users to which the respective ACER or respectively-associated user belongs.

38. A machine-usable memory according to claim 31 wherein the ACER-specific key is a private decryption key of a user associated with said ACER.

39. A machine-usable memory according to claim 31 wherein each ACER further includes non-encrypted other data and the non-encrypted other data contains at least three members of the following group:
- (b.1i) a unique identification of the respective ACER for distinguishing the respective ACER from other ACER's within said file label;
- (b.1ii) an identification of a decryption algorithm that may be used to decrypt the encrypted *DATA* portion with a plaintext version of the first decryption key as derived from the respective ACER-contained, encrypted version of said first decryption key;
- (b.1iii) an identification of the first encrypting process that was used to produce said encrypted *DATA* portion;
- (b.1iv) a special processing code for specifying special processing for the respective ACER;
- (b.1v) a record format code for specifying a respective data format for additional data contained in the respective ACER; and
- (b.1vi) a group identifying code for specifying a group of ACER's or a group of users to which the respective ACER or respectively-associated user belongs;

and wherein the file label portion further includes:
- (b.2) a digital signature covering part of the file label portion; and
- (b.3) an extension buffer space not covered by said digital signature.

40. A machine-usable memory according to claim 31 wherein each ACER further includes non-encrypted other data and the non-encrypted other data contains at least three members of the following group:
- (b.1i) a unique identification of the respective ACER for distinguishing the respective ACER from other ACER's within said file label;
- (b.1ii) an identification of a decryption algorithm that may be used to decrypt the encrypted *DATA* portion with a plaintext version of the first decryption key as derived from the respective ACER-contained, encrypted version of said first decryption key;
- (b.1iii) an identification of the first encrypting process that was used to produce said encrypted *DATA* portion;
- (b.1iv) a special processing code for specifying special processing for the respective ACER;
- (b.1v) a record format code for specifying a respective data format for additional data contained in the respective ACER; and
- (b.1vi) a group identifying code for specifying a group of ACER's or a group of users to which the respective ACER or respectively-associated user belongs;

and wherein the file label portion further includes:
- (b.2) a number-of-ACER's signal representing the number of activated ACER's present in the label portion; and
- (b.3) a length-of-ACER's signal indicating the total extent of activated ACER's present in the label portion.

41. A machine-implemented file-decrypting method for decrypting a multi-user data structure in response to an access request associated with one user among a plurality of users, wherein the multi-user data structure has:
- (1) a secured file data portion (*FILE DATA* portion) that is encrypted by a first encrypting process using a first encryption key; and
- (2) a file label portion associated with the secured file data portion, where the file label portion includes:
  - (2.1) a plurality of Access-Control-Entries Records (ACER's) each containing a respective, encrypted version of a first decryption key, said first decryption key being a signal that is applicable to a first decrypting process for decrypting said *FILE DATA* portion, wherein each ACER-contained encrypted version is decipherable by an ACER-specific key, said file-decrypting method comprising the steps of:
- (a) locating among said Access-Control-Entries Records (ACER's), an ACER associated with said one user;
- (b) obtaining a private key of the one user; and
- (c) using the obtained key to decrypt the respective, encrypted version in the located ACER to thereby produce a plaintext version of the first decryption key; and
- (d) using the produced plaintext version of the first decryption key to decrypt the secured file data portion.

42. A machine-implemented file-decrypting method according to claim 41 where the file label portion includes:
- (2.2) a digital signature covering part of the file label portion; and said method further comprises the step of:
- (e) using the digital signature to verify that the file label portion has not been tampered with in an unauthorized manner before using the file label portion.

43. A machine-implemented file-decrypting method according to claim 41 where the file label portion includes:
- (2.2) a label-presence verifying field containing code for verifying that the label portion is present; and said method further comprises the step of:
- (e) using the label-presence verifying field to verify that the file label is present before proceeding with one or more of said steps (a) through (d).

44. A method for distributing encrypted *FILE DATA* signals to a plurality of users and for providing respective authorized users among said plurality of users each with intelligible access to information represented by a plaintext version of the encrypted *FILE DATA* signals, wherein said *FILE DATA* signals are producible by using a first encrypting algorithm in combination with a first encryption key to encrypt the plaintext version of said *FILE DATA* signals, said method comprising the steps of:
- (a) conveying the encrypted *FILE DATA* signals to a first data conveyance means;
- (b) defining a companion first decryption algorithm and a companion first decryption key that are usable for decrypting the conveyed *FILE DATA* signals;
- (c) for each respective authorized user, encrypting the companion first decryption key by using a respective second encryption algorithm in combination with a respective second encryption key to thereby produce a respective encrypted version of the companion first decryption key, wherein said second encryption key is a public key of the respective authorized user, and said respective second encryption algorithm is an asymmetric algorithm based on paired public and private keys;
- (d) for each respective authorized user, conveying the respective encrypted version to the first conveyance means; and
- (e) for each respective authorized user, associating at least partially by means of the first conveyance means, the respective encrypted version of the companion first decryption key with the conveyed *FILE DATA* signals.

45. The method of claim 44 further comprising the steps of:
- (f) assigning a unique user identification code sequence to each respective authorized user; and
- (g) conveying the unique user identification code sequence of each respective authorized user to the first conveyance means;

wherein said step (e) of associating includes:
- (e.1) associating the conveyed unique user identification code sequence of each respective authorized user with the user's respective encrypted version of the companion first decryption key.

46. A method for reducing possible data leakage due to an allegedly compromised user key where the allegedly compromised user key is initially usable for gaining intelligible access to a file access key, the file access key providing intelligible access to an encrypted file, said method comprising the steps of:
- (a) providing a file security label having a plurality of access control entries records (ACER's), wherein each ACER includes a respective encrypted version of the file access key, each respective encrypted version of the file access key of each ACER being decipherable with a respective user key associated with said ACER;
- (b) locating among said plurality of access control entries records (ACER's), an ACER if any, that is associated with said allegedly compromised user key;

(c) canceling out the intelligible-access gaining usability of the located ACER from the file label without affecting such same usability of others of the ACER's that are not associated with said allegedly compromised user key.

47. A key-distribution method for use with an asymmetric first encryption/decryption system where the first encryption/decryption system uses a first encryption key during encryption and the first encryption/decryption system uses a different first decryption key during decryption, said method comprising the steps of:

(a) encrypting supplied plaintext data using the first encryption key to produce resulting encrypted data;

(b) supplying the resulting encrypted data to a data conveying means;

(c) producing plural encrypted versions of the first decryption key using a respective plurality of different second encryption keys and conveying said plural encrypted versions of the first decryption key to the data conveying means;

(d) producing plural encrypted versions of the first encryption key using a respective plurality of different encrypting keys and further conveying said encrypted versions of the first encryption key to said data conveyance means, wherein said plurality of different encrypting keys are each respectively part of a respective asymmetric second encryption/decryption system; and (e) associating by means of an associating media, respective ones of the encrypted versions of the first encryption key and respective ones of the encrypted versions of the first decryption key with one another and with said encrypted data.

48. The method of claim 47 further comprising the step of selectively conveying the encrypted versions of the first encryption key to some but not all authorized users.

49. A method for selectively enabling multiple users to access encrypted replicas of a given file where respective first and second ones of the encrypted replicas are stored in different first and second locations, said method comprising the steps of:

(a) providing a file label at the first location that permits a given user (User_#J) to intelligibly access the first encrypted replica which is located at the first location; and (b) providing a second file label at the second location that blocks the same user (User_#J) from intelligibly accessing the second encrypted replica which is located at said second location.

50. A method for changing the number of authorized users that are authorized to intelligibly access an encrypted *FILE DATA* portion of a file wherein the file further includes a file label portion containing one or more active access control entries records (ACER's), said file label portion including a number-of-ACER's indicator for defining the number of active ACER's, and each ACER including a respective encrypted version a file access key, the file access key providing intelligible accessibility to said encrypted *FILE DATA* portion, said method comprising the step of:

(a) altering the number-of-ACER's indicator in the label portion to thereby redefine the number of active ACER's.

51. A method for locating related versions of a secured file where the secured file and the related versions each includes a *FILE DATA* portion and an associated label portion, the label portion having an ordered collection of access control entries records (ACER's) including a first ACER, each ACER being logically associated with a unique user identification, said method comprising the steps of:

(a) obtaining the user identification associated with the first ACER in said collection; and (b) using the obtained user identification to locate secured other files wherein the first ACER in each secured other file is logically associated to the same user identification.

52. A method for authorizing new users to intelligibly access a secured file having an *FILE DATA* portion and an associated file label portion where the file label portion includes activated ACER's and the file label portion further includes an extension buffer zone for receiving ACER add-on requests, said method comprising the steps of:

(a) including the public key of a requesting user in a respective ACER add-on request;

(b) using the included public key to encrypt a plaintext version of a file access key, where the plaintext version of a file access key is usable for decrypting the *FILE DATA* portion.

53. A method of hiding from general viewing the presence of one or more ACER's (Access-Control-Entries Records) in a file label portion containing a plurality of ACER's, said method comprising the step of:

(a) including a special handling code in the respective one or more ACER's whose presence is to be hidden, the included special handling code being for instructing one or more label-using programs to not display each of said one or more specially-handled ACER's.

* * * * *

UNITED STATES PATENT AND TRADEMARK OFFICE
CERTIFICATE OF CORRECTION

PATENT NO. : 5,953,419
DATED : September 14, 1999
INVENTOR(S) : Shawn R. Lohstroh et al.

It is certified that error appears in the above-indentified patent and that said Letters Patent is hereby corrected as shown below:

Column 1, line 23, delete "[Attorney Docket No. SYMA1015]";
line 25, delete "Cohen";
line 30, before the period (.), insert --; and later issued as U.S. Patent 5,699,428 on 12/16/97--.
Column 4, line 56, "FIG. 5a" should be --FIG. 5A--.
Column 7, line 18, "FILE_DATA 203" should be --FILE_1 DATA 203--.
Column 19, line 23, "FIG. 1B" should be --FIG. 5B--.

Signed and Sealed this

Twenty-second Day of August, 2000

Attest:

Q. TODD DICKINSON

*Attesting Officer*      *Director of Patents and Trademarks*